(12) United States Patent
Honda et al.

(10) Patent No.: US 12,345,661 B2
(45) Date of Patent: Jul. 1, 2025

(54) DEFECT INSPECTION APPARATUS AND DEFECT INSPECTION METHOD

(71) Applicant: Hitachi High-Tech Corporation, Tokyo (JP)

(72) Inventors: Toshifumi Honda, Tokyo (JP); Shunichi Matsumoto, Tokyo (JP); Nobuhiro Obara, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 512 days.

(21) Appl. No.: 17/633,256

(22) PCT Filed: Aug. 14, 2019

(86) PCT No.: PCT/JP2019/031918
§ 371 (c)(1),
(2) Date: Feb. 7, 2022

(87) PCT Pub. No.: WO2021/029025
PCT Pub. Date: Feb. 18, 2021

(65) Prior Publication Data
US 2022/0357285 A1    Nov. 10, 2022

(51) Int. Cl.
*G01N 21/956* (2006.01)
*G01N 21/01* (2006.01)
(Continued)

(52) U.S. Cl.
CPC ........... *G01N 21/956* (2013.01); *G01N 21/47* (2013.01); *G01N 21/8851* (2013.01); *G01N 2021/0162* (2013.01); *G01N 2021/8841* (2013.01)

(58) Field of Classification Search
CPC ............. G01N 21/956; G01N 21/8851; G01N 2021/0162; G01N 21/47; G01N 2021/8841
See application file for complete search history.

(56) References Cited

U.S. PATENT DOCUMENTS 9,602,780 B2 *   3/2017   Ito ........................... G01N 21/47
9,683,946 B2 *   6/2017   Otani .................. G01N 21/9501
(Continued)

FOREIGN PATENT DOCUMENTS

JP    2007-033433 A    2/2007
JP    2009-053132 A    3/2009
(Continued)

OTHER PUBLICATIONS

International Preliminary Report on Patentability mailed Nov. 11, 2021 in International Application No. PCT/JP2021/003285.
(Continued)

*Primary Examiner* — Tarifur R Chowdhury
*Assistant Examiner* — Joshua M Carlson
(74) *Attorney, Agent, or Firm* — Miles & Stockbridge, P.C.

(57) ABSTRACT

A defect inspection apparatus including illumination optical system configured to irradiate a sample with an illumination spot; a detector arrangement configured to detect, from a plurality of directions, reflected light from the sample; a scanning controller configured to control a scan of the sample with the illumination spot by overlapping detection regions such that the detection regions partially overlap; and a signal processor configured to process a signal obtained by detecting the reflected light from the sample by the detection unit to detect a defect. The signal processor is configured to synthesize an integrated signal by processing the signal detected a plurality of times by overlapping the reflected light of the sample for each detection region by the detection unit; and to detect the defect on a surface of the sample based on the synthesized integrated signal.

13 Claims, 19 Drawing Sheets

(51) Int. Cl.
*G01N 21/47* (2006.01)
*G01N 21/88* (2006.01)

(56) References Cited

U.S. PATENT DOCUMENTS

| | | |
|---|---|---|
| 2006/0290923 A1 | 12/2006 | Nakano et al. |
| 2009/0059216 A1 | 3/2009 | Shibata et al. |
| 2009/0185179 A1 | 7/2009 | Hill |
| 2012/0092656 A1 | 4/2012 | Nakao et al. |
| 2012/0141012 A1* | 6/2012 | Sakai ............ H01L 22/20 382/149 |
| 2013/0003052 A1 | 1/2013 | Nakao et al. |
| 2013/0301042 A1* | 11/2013 | Urano ............ G01N 21/956 356/237.5 |
| 2014/0253912 A1* | 9/2014 | Honda ............ G01N 21/9501 356/237.5 |
| 2014/0270471 A1 | 9/2014 | Cao et al. |
| 2014/0375988 A1* | 12/2014 | Ito ............ G01N 21/8851 356/237.5 |
| 2015/0356727 A1* | 12/2015 | Urano ............ G06T 7/0008 382/149 |
| 2020/0256804 A1 | 8/2020 | Honda et al. |
| 2022/0291140 A1 | 9/2022 | Honda et al. |

FOREIGN PATENT DOCUMENTS

| | | |
|---|---|---|
| JP | 2011013058 A | 1/2011 |
| JP | 2011158260 A | 8/2011 |
| JP | 2012137350 A | 7/2012 |
| JP | 2015028457 A | 2/2015 |
| WO | 2007110672 A1 | 10/2007 |
| WO | 2018216277 A1 | 11/2018 |
| WO | 2020136697 A1 | 7/2020 |
| WO | 2021024319 A1 | 2/2021 |

OTHER PUBLICATIONS

Search Report mailed Apr. 27, 2021 in International Application No. PCT/JP2021/003285.
Written Opinion mailed Apr. 27, 2021 in International Application No. PCT/JP2021/003285.
Search Report mailed Oct. 15, 2019 in International Application No. PCT/JP2019/031918.
Written Opinion mailed Oct. 15, 2019 in International Application No. PCT/JP2019/031918, English translation for the "Written Opinion mailed Oct. 15 2019 . . . " has been provided as of Nov. 22, 2024, and had hereby been considered.

* cited by examiner

[FIG. 1A]
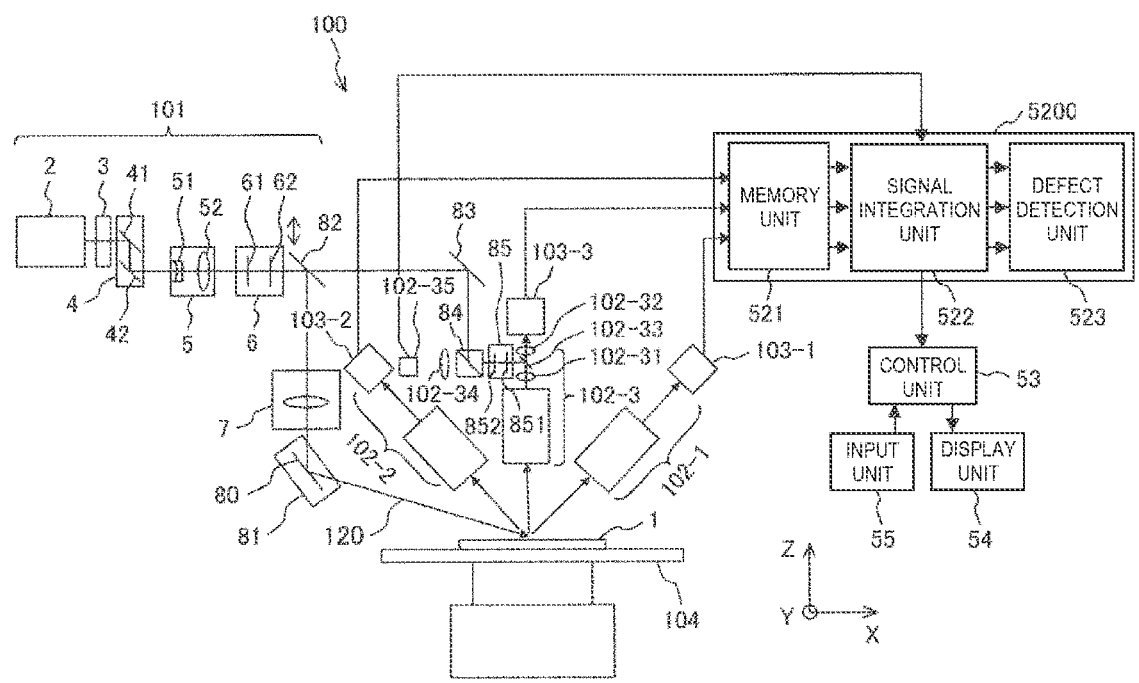
[FIG. 1B]
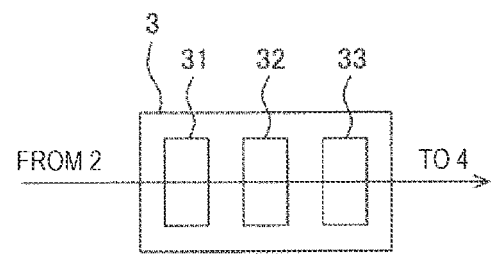
[FIG. 1C]
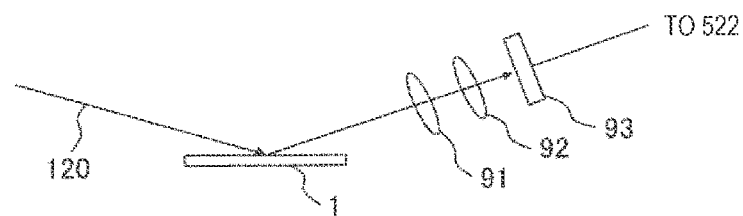

[FIG. 2]
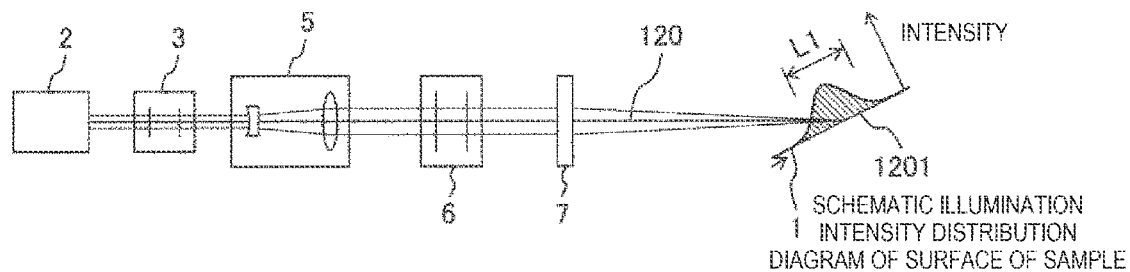
[FIG. 3]
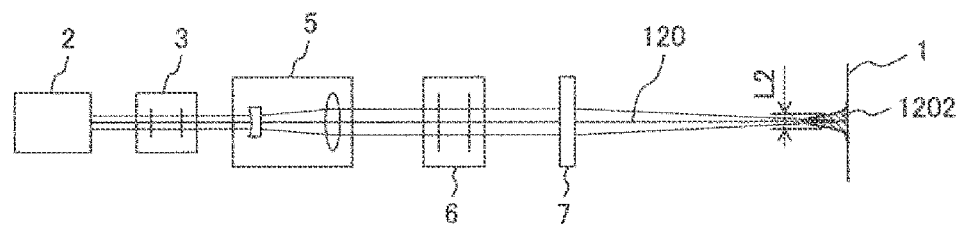
[FIG. 4]
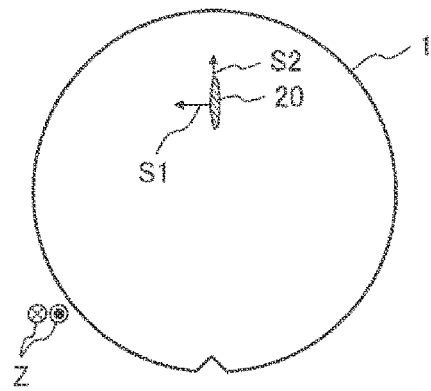

[FIG. 5A]
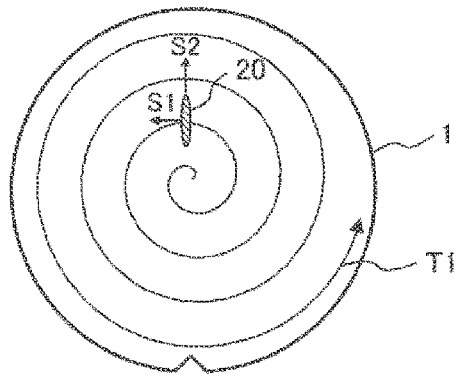
[FIG. 5B]
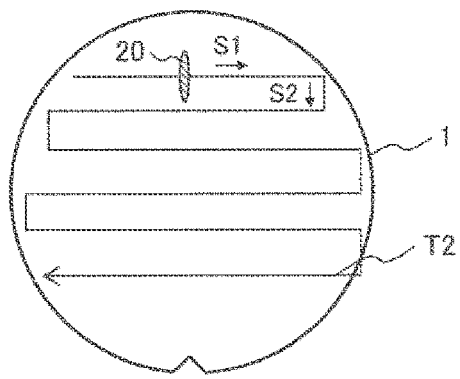
[FIG. 6]
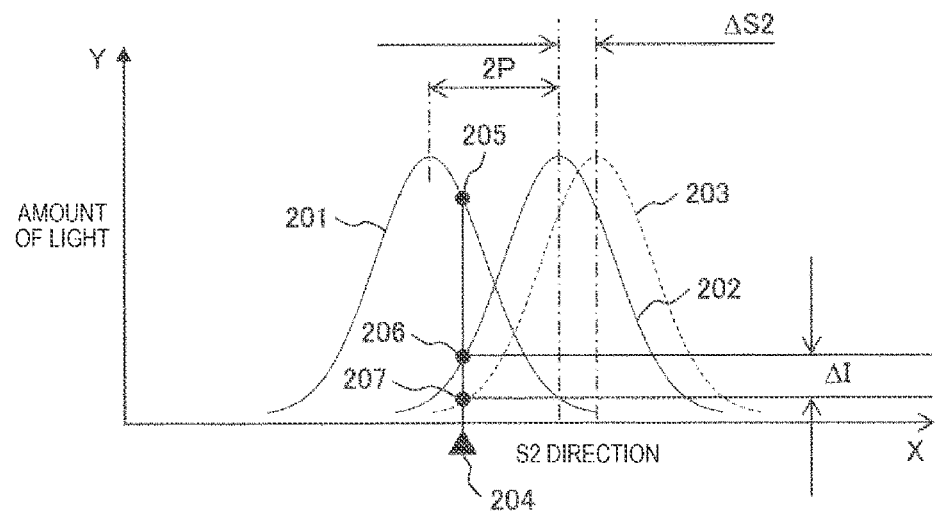

[FIG. 7A]
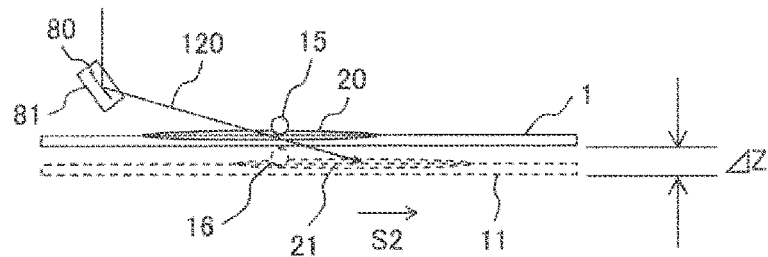
[FIG. 7B]
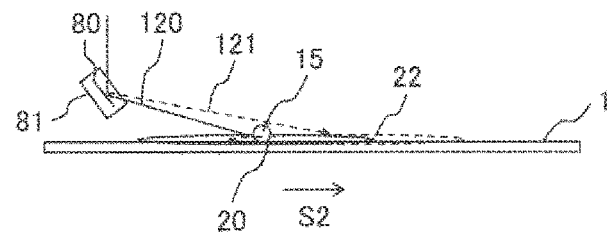
[FIG. 7C]
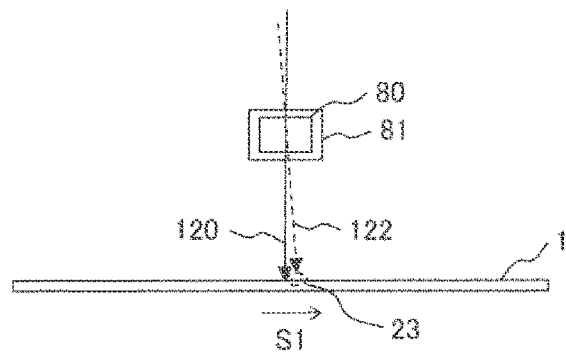

[FIG. 8]
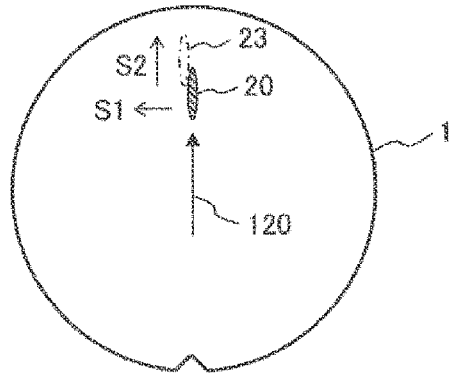
[FIG. 9]
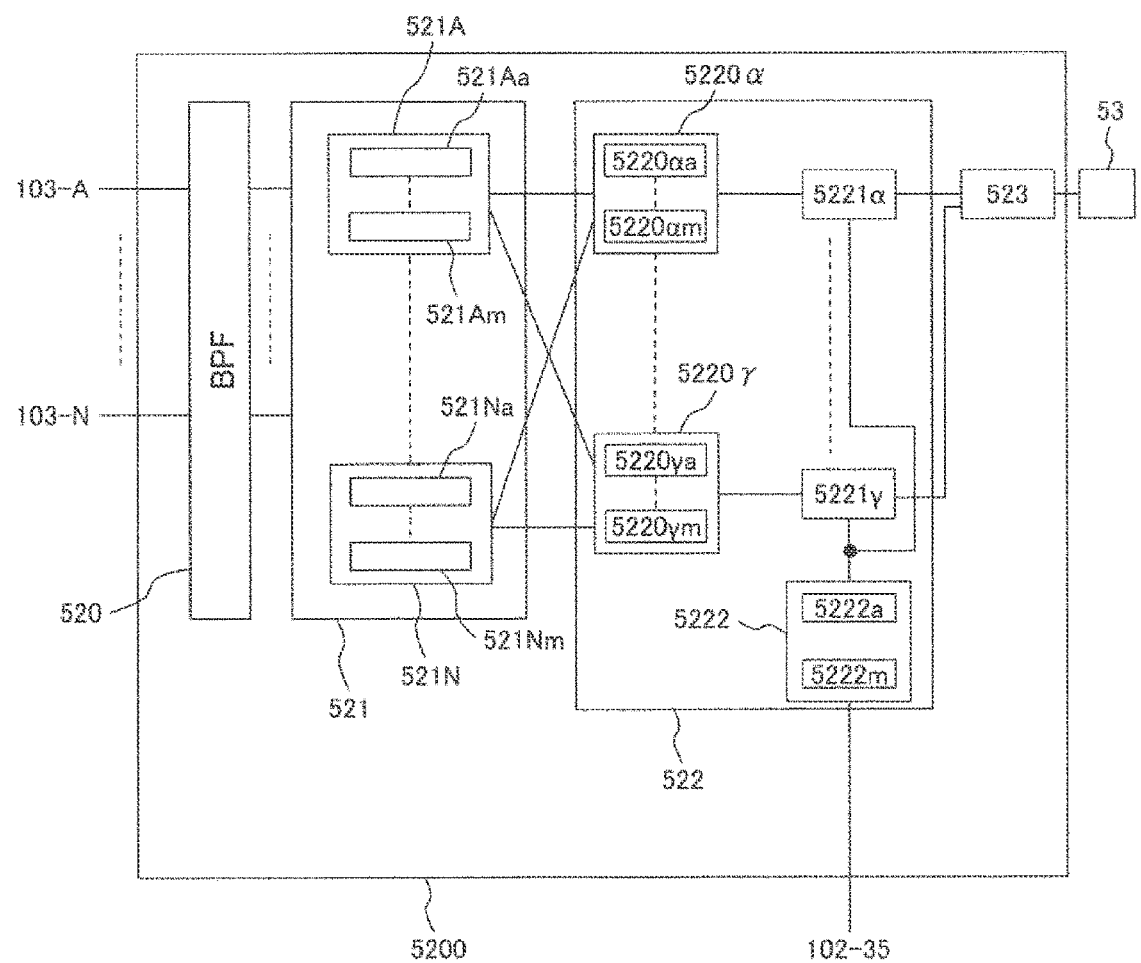

[FIG. 10A]
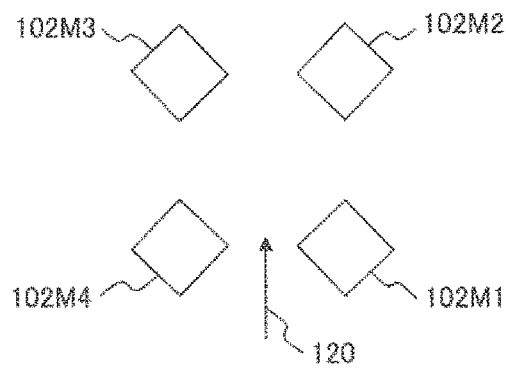
[FIG. 10B]
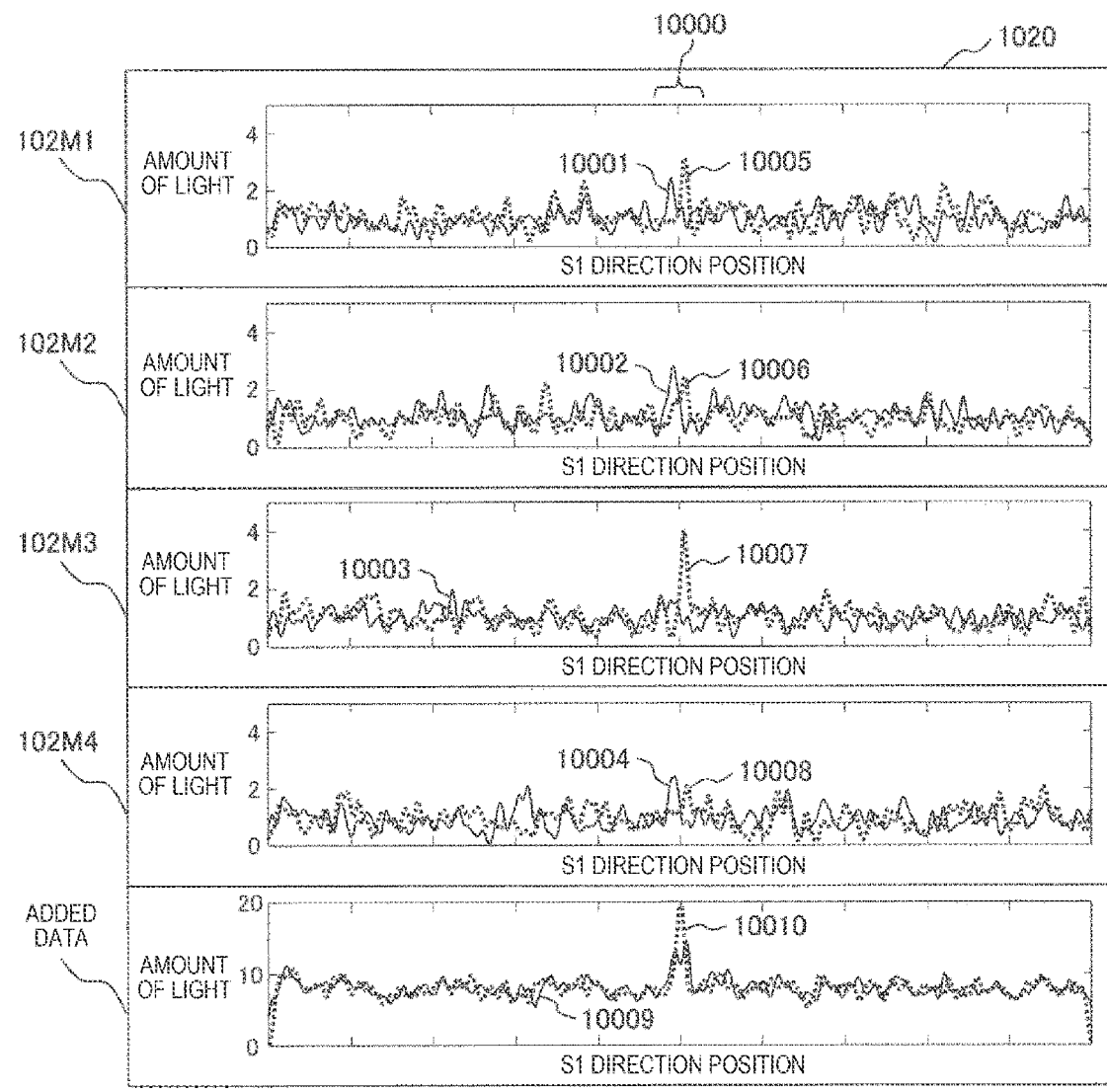

[FIG. 11]
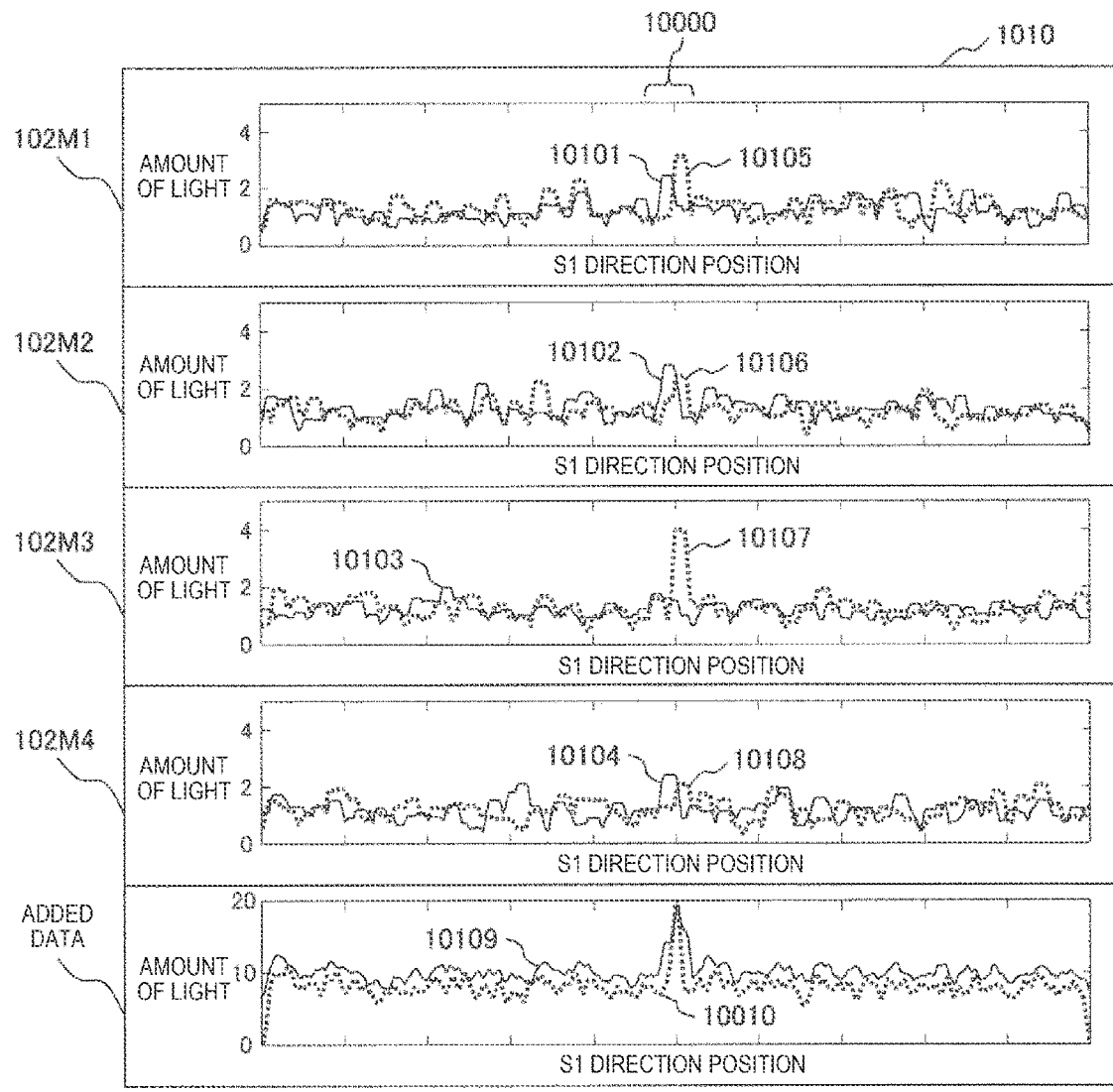

[FIG. 12A]
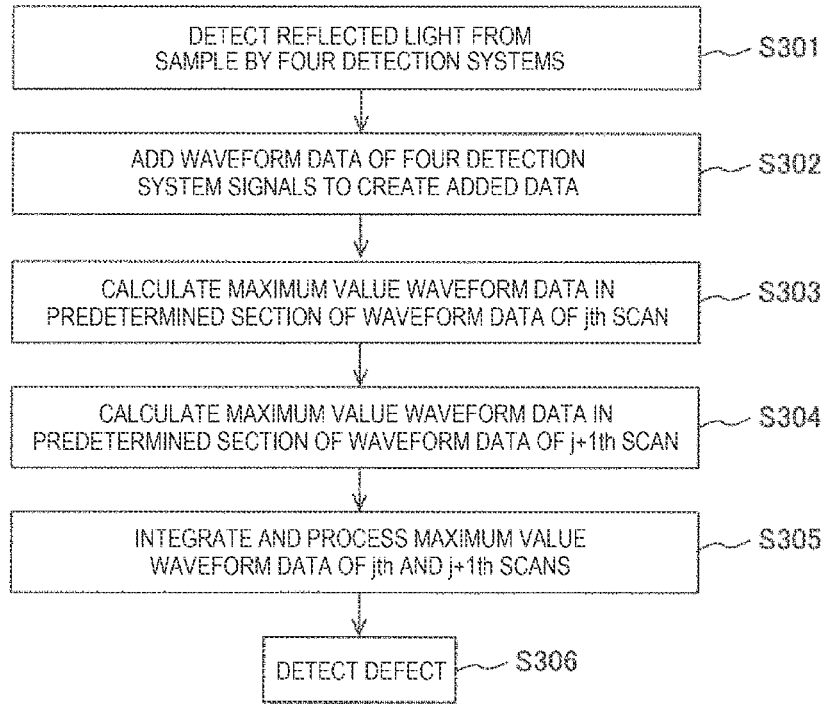
[FIG. 12B]
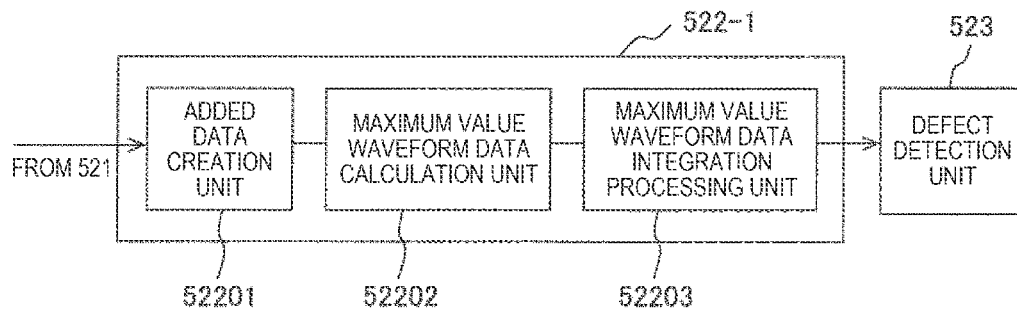

[FIG. 13]
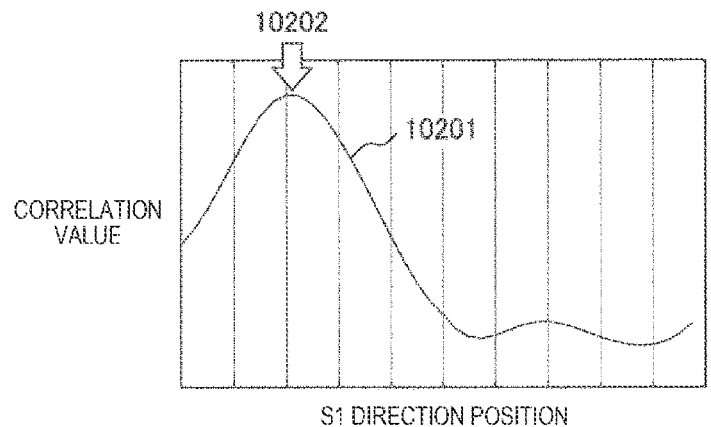
[FIG. 14]
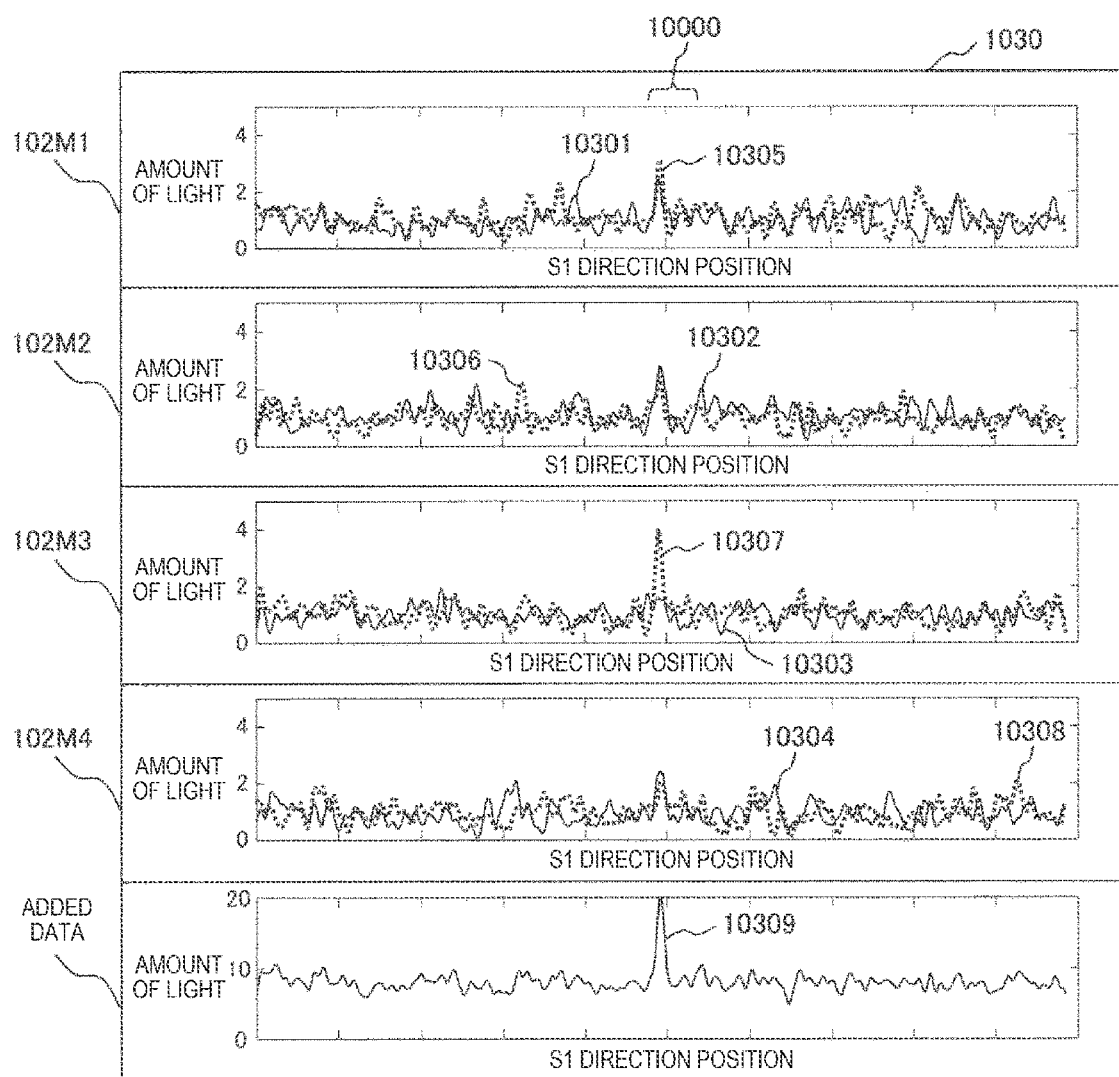

[FIG. 15A]
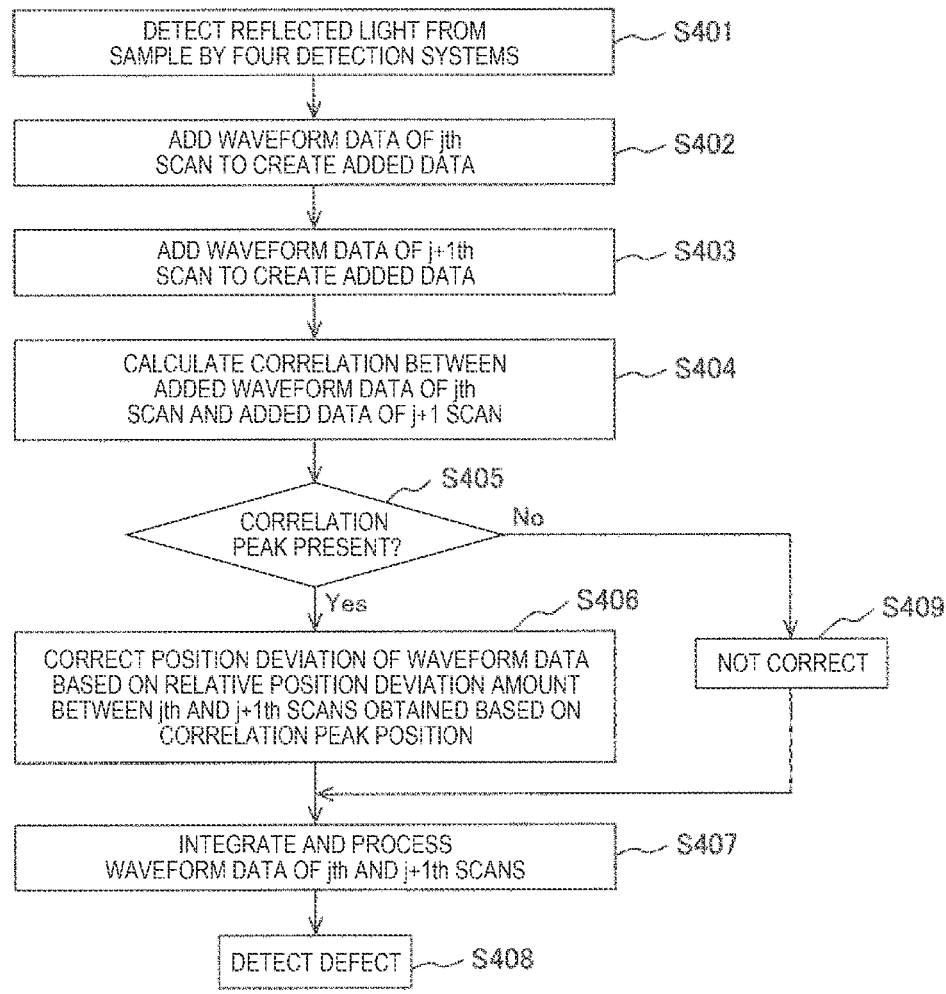
[FIG. 15B]
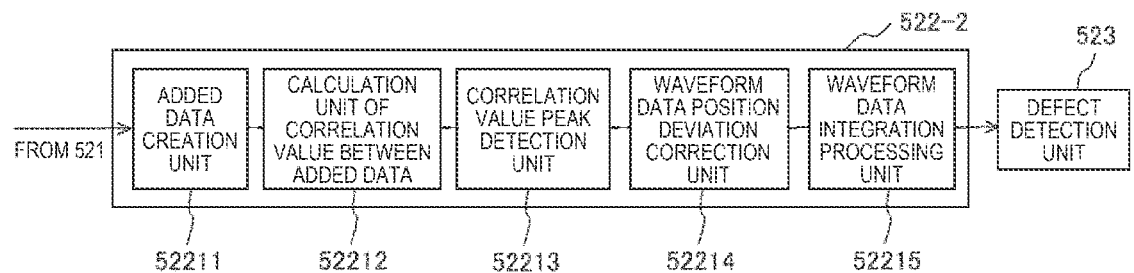

[FIG. 16]
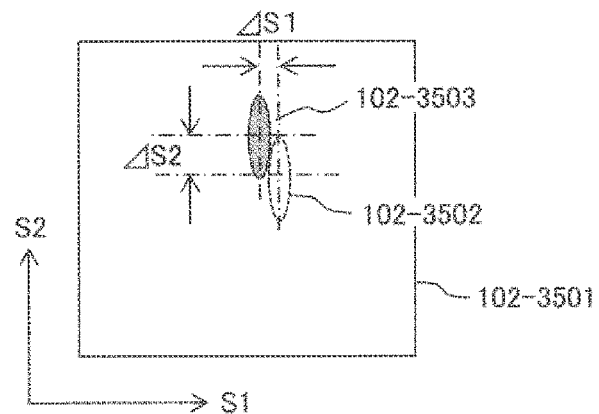
[FIG. 17A]
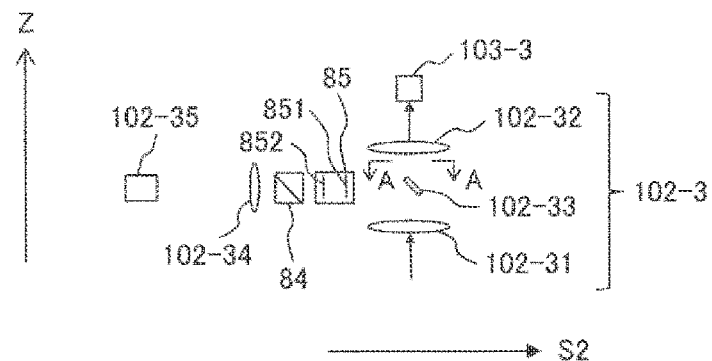
[FIG. 17B]
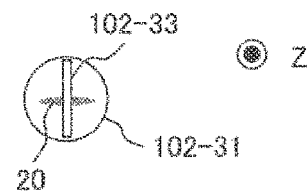

[FIG. 18]
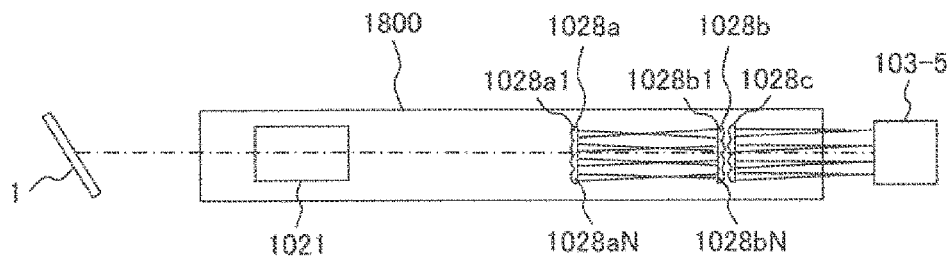
[FIG. 19A]
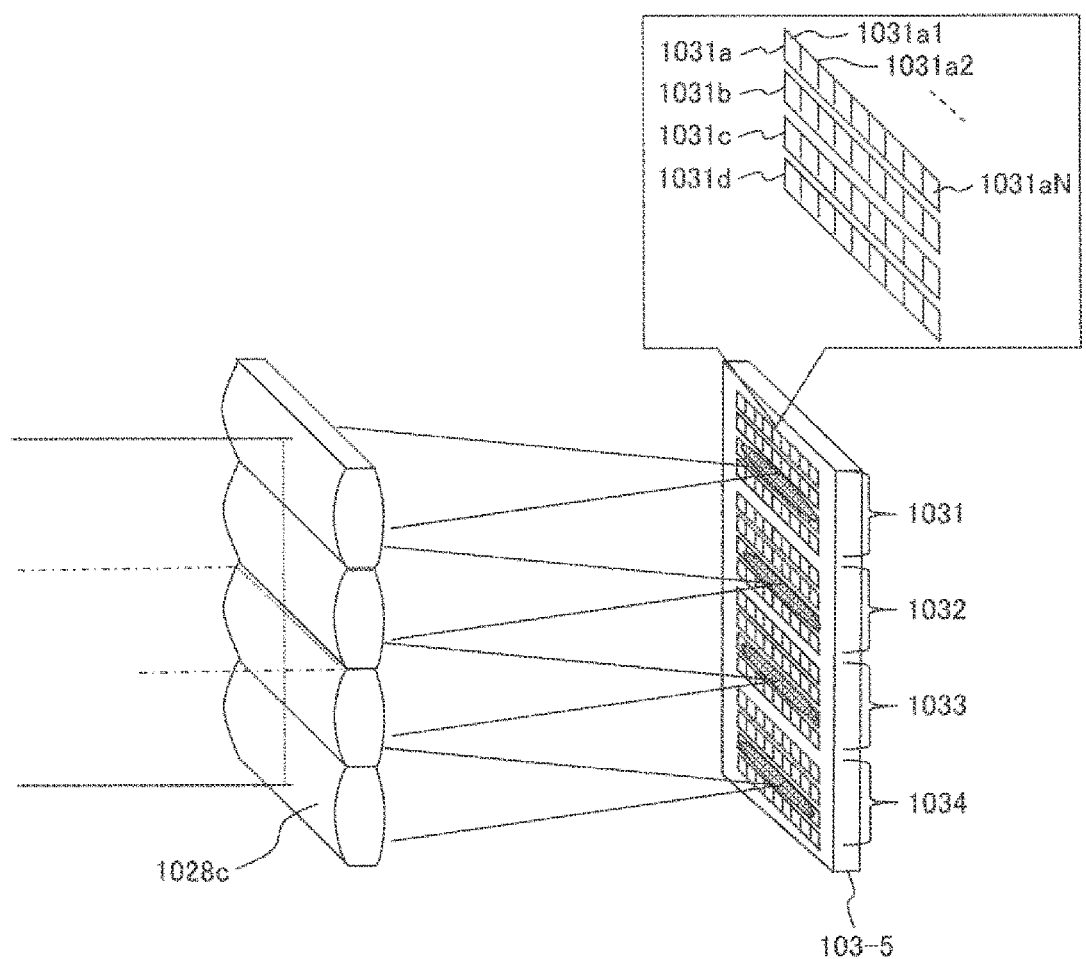

[FIG. 19B]
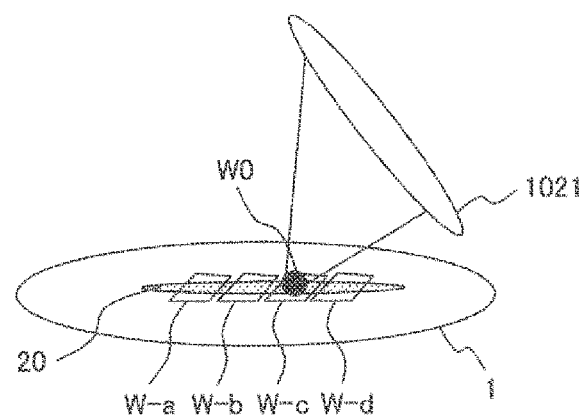

[FIG. 20]
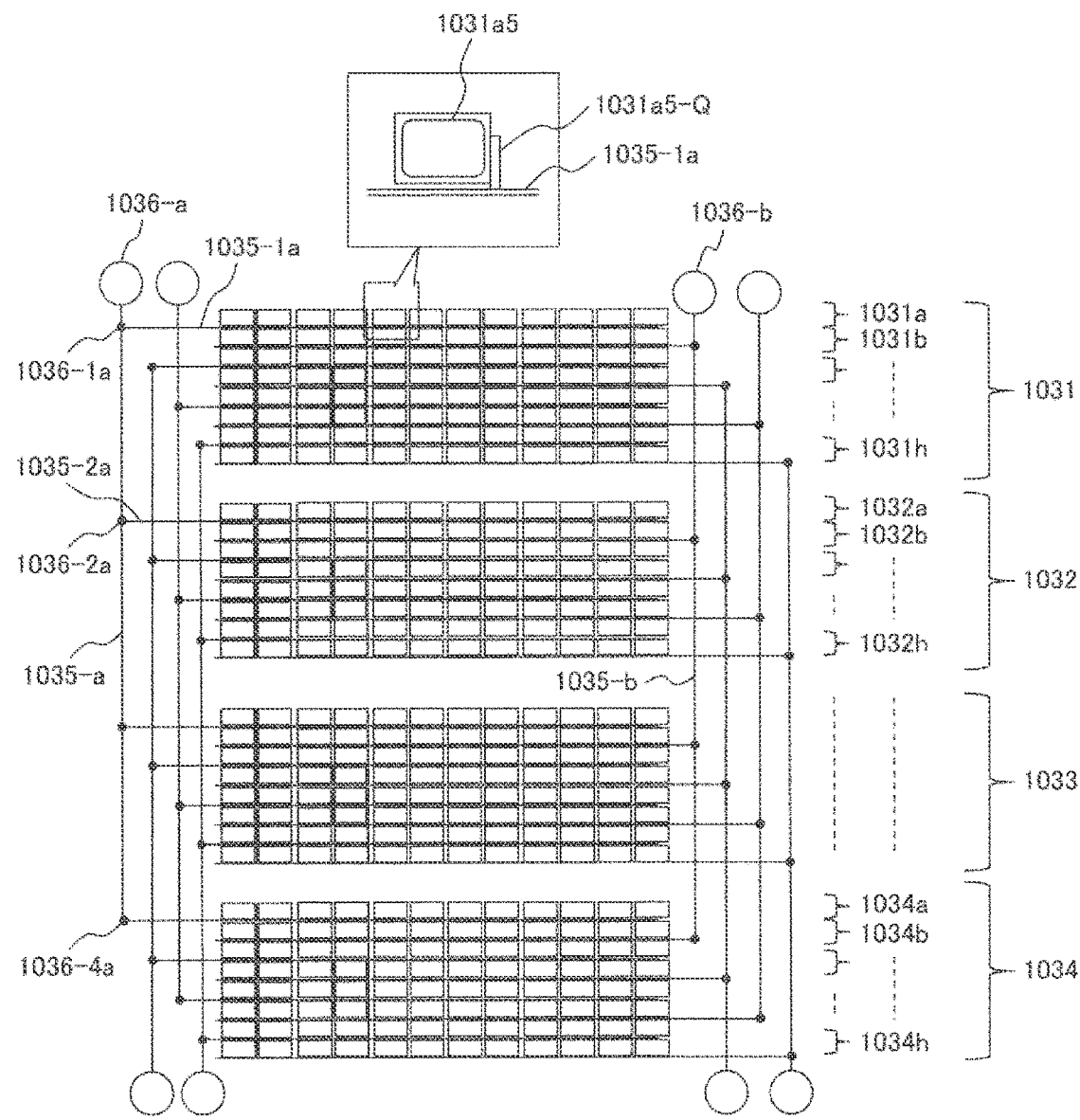

[FIG. 21]
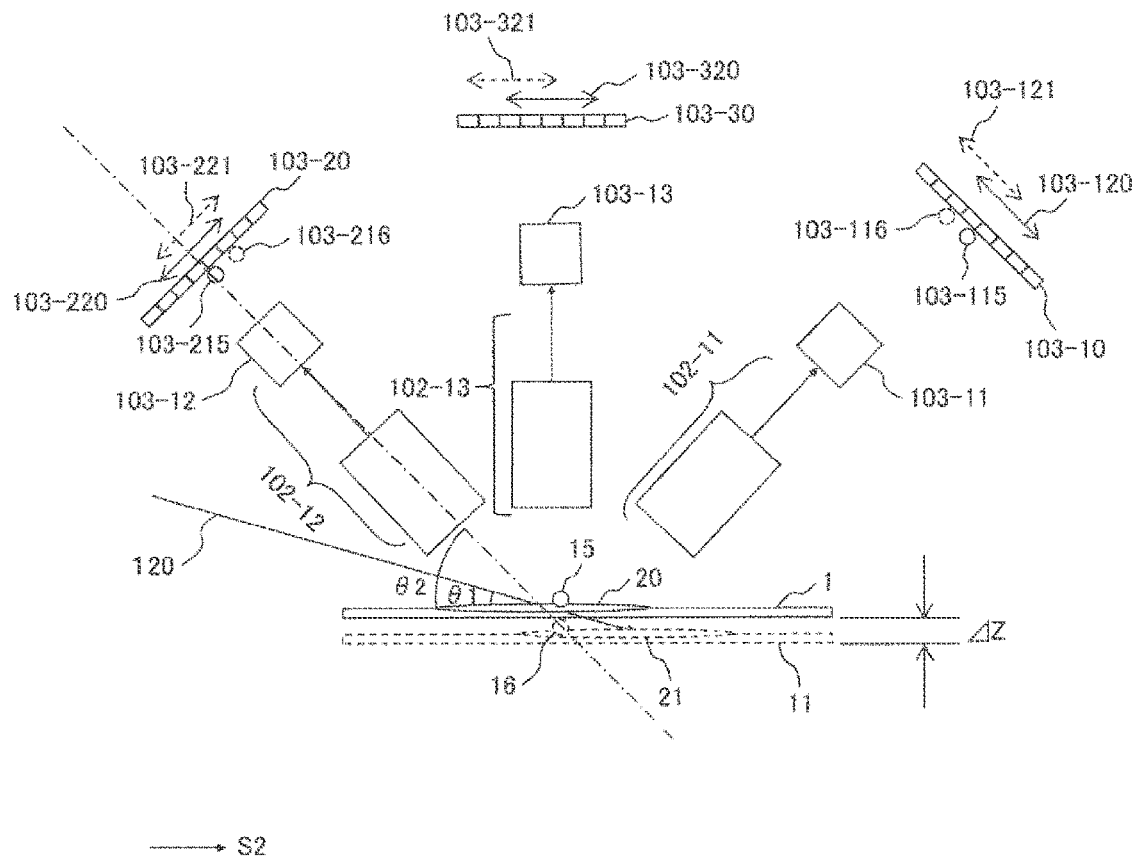
[FIG. 22A]
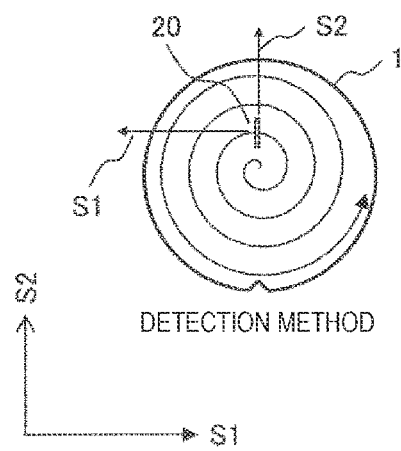
DETECTION METHOD

[FIG. 22B]
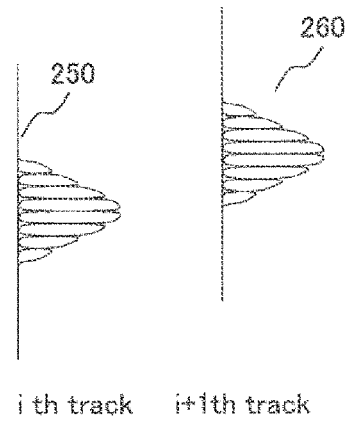
[FIG. 22C]
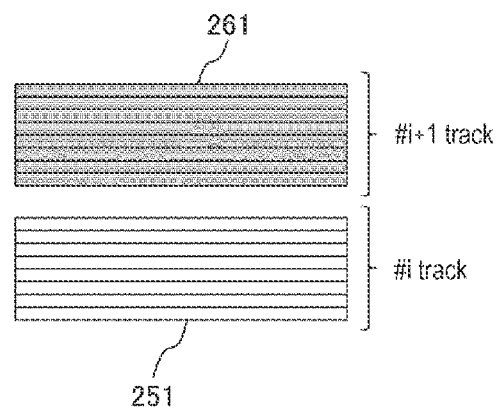
[FIG. 22D]
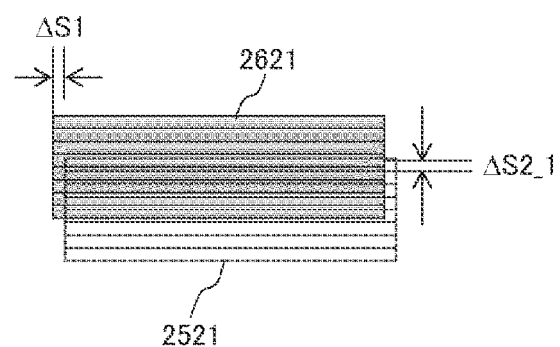

[FIG. 22E]
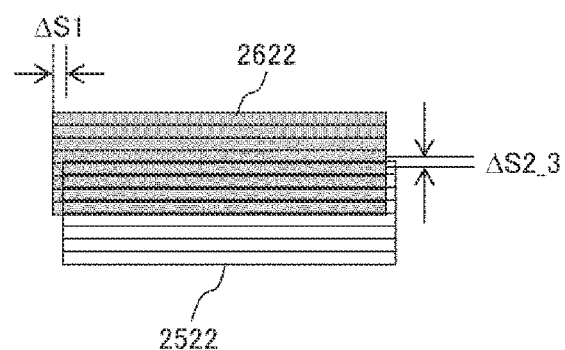

[FIG. 23]
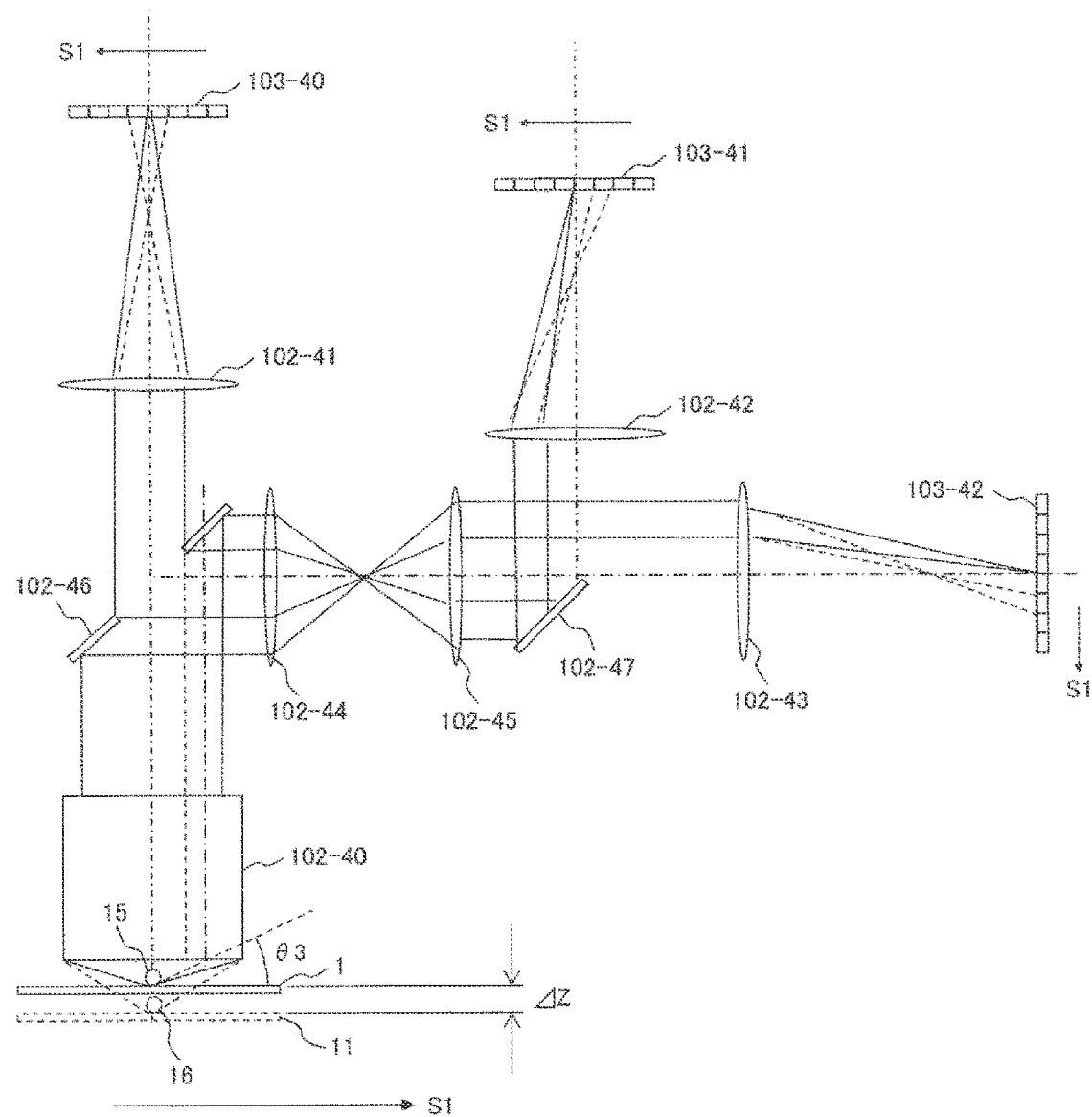

[FIG. 24]
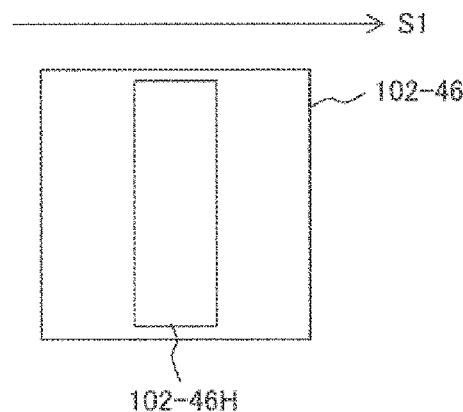
[FIG. 25]
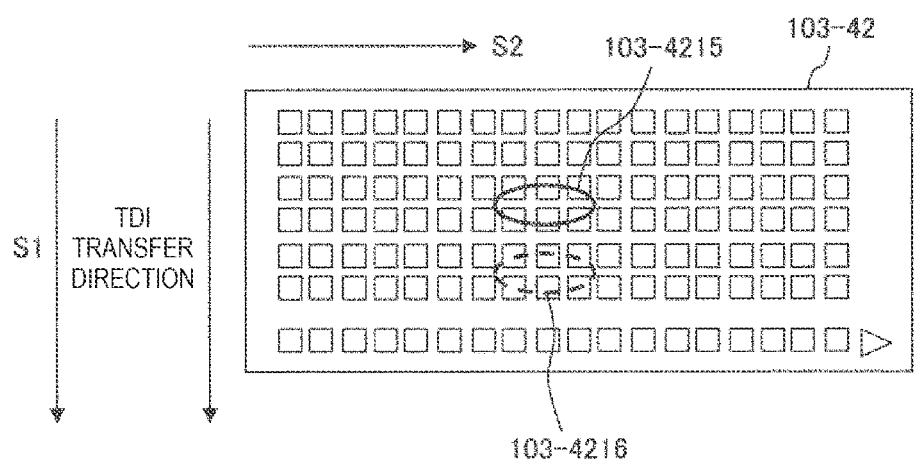

DEFECT INSPECTION APPARATUS AND DEFECT INSPECTION METHOD

TECHNICAL FIELD

The present invention relates to a defect inspection apparatus and a defect inspection method for inspecting a minute defect present on a sample surface, and determining and outputting a position, a type and a dimension of the defect.

BACKGROUND ART

In a manufacturing line for a semiconductor substrate, a thin film substrate or the like, inspection of a defect that is present on a surface of the semiconductor substrate, the thin film substrate or the like is executed to maintain or enhance a yield of a product. In related art for defect inspection, for example, a technique described in PTL 1 is known.

PTL 1 describes a defect inspection method for inspecting a defect on a surface of a sample. The defect inspection method includes a step of irradiating a predetermined region on the surface of the sample with illumination light having an elliptical illumination region a plurality of times, a step of receiving light scattered from the surface of the sample each time by a detector capable of detecting the scattered light of a plurality of pixels provided corresponding to the illumination region, a step of converting the light scattered from the surface of the sample each time into a detection signal each time, step of extracting a Haze signal obtained based on scattered light generated from an irregularity on the surface of the sample from each of the plurality of detection signals converted in the step of converting the light, a step of calculating a pixel deviation amount for each of the plurality of detection signals by comparing a distribution of the plurality of Haze signals extracted in the step of extracting a Haze signal with a predetermined light amount distribution, a step of correcting the plurality of detection signals using the pixel deviation amount calculated for each of the plurality of detection signals, and a step of detecting the defect by adding the plurality of detection signals corrected in the step of correcting the plurality of detection signals.

CITATION LIST

Patent Literature

PTL 1: JP-A-2011-013058

SUMMARY OF INVENTION

Technical Problem

The defect inspection used in a manufacturing process of a semiconductor and the like is required to detect a minute defect, measure a dimension of the detected defect with high accuracy, inspect the sample non-destructively (for example, without altering the sample), obtain, for example, substantially constant inspection results regarding the number, a position, the dimension, and a type of the detected defect when the same sample is inspected, inspect a large number of samples within a certain period of time, and correctly determine the position of the detected defect.

In order to improve a defect detection sensitivity using an optical method, it is necessary to cause the scattered light from the defect due to the illumination on the sample surface to be relatively larger than the scattered light from the sample surface. To achieve this, a method of increasing as illumination power density per unit area by reducing an illuminated area for a sample to be inspected, a method of introducing an imaging detection into a detection system and reducing a ratio of the amount of the scattered light from the sample surface to the amount of light on the defect by reducing a pixel area, and a method of adding the detection signals detected a plurality of times at the same position and increasing the amount of signal light from the defect are known. Here, when a large number of samples are inspected within a certain period of time, it is typically necessary to move the samples to be inspected and a detection system at a relatively high speed.

In typical inspecting, it is possible to keep a distance between the samples and the detection system constant by moving either the detection system or the samples on a stage such that the distance is constant. However, for example, it is difficult to execute a control in an inspection in which the samples are rotated several thousand times for an hour. Therefore, a work distance inevitably fluctuates. On the other hand, in order to detect the minute defect, a high-power laser source having a short wavelength, such as a deep ultraviolet laser source, is required.

Since such a light source is large in size, an optical path leading to the sample is generally long. In order to reduce a damage to an applied optical component, for example, dry air or nitrogen gas is introduced into the optical path. Air fluctuations also occur due to the sample that moves at a high speed. Accordingly, a refractive index in the optical path fluctuates with time, and an illumination position fluctuates. Since the optical path is long, even a minute mechanical vibration fluctuates the illumination position.

A technique described in PTL 1 discloses a method including deriving a height fluctuation of the sample surface based on roughness scattered light of the sample to be inspected at an irradiation position of the illumination, correcting a pixel deviation caused by the height fluctuation in an oblique detector, and adding data of each photoelectric conversion unit to execute a defect determination. However, the method does not take into consideration the fluctuation of the illumination position due to the air fluctuation in the optical path and the mechanical vibration.

In order to detect reflected light from the sample at a high speed, a line sensor or a point sensor is generally applied in the photoelectric conversion unit. If these sensors are applied, in either method, at least a specific one-dimensional direction of two-dimensional data acquisition positions on the sample surface is determined by the irradiation position of the illumination at a timing when the data is acquired. If the illumination position deviates from an assumed position due to the fluctuation of air or the mechanical vibration as described above, the data acquisition positions deviate due to this.

When data acquired at different timings are added to generate data that is obtained by adding the scattered light from the minute defect, an image of the defect is enlarged and captured beyond an irradiation range of an actual illumination, a luminance peak becomes smaller, and the defect detection sensitivity and coordinate accuracy deteriorate. In particular, in an inspection apparatus that executes an inspection with a high sensitivity, in order to increase the power density per unit area of the illumination on the sample surface, elliptical illumination having a shorter minor axis than a major axis is often executed, and a minor axis direction is often controlled from a few micrometers to a sub-micrometer size. Even if the illumination position deviates by a few micrometers, the sensitivity is greatly reduced.

In order to detect a signal from a weak defect, it is essential to bring a lens that detects the reflected light from the defect closer to the sample surface, and as a result, an illumination optical system needs to be placed away from the sample surface. Accordingly, the illumination position on the sample surface is likely to be affected even by a slight fluctuation in an illumination angle.

If the irradiation position of the illumination changes, it becomes difficult to accurately measure the height of the sample surface. In general, the height of the sample surface is detected using a principle of triangulation, including the method in PTL 1. Here, when the height of the sample surface is measured based on the roughness scattered light of incident light, the incident light needs to be stable. When the minute defect is detected using a laser scattering method, it is known that the sensitivity increases when an incidence angle of the illumination is set large, and the position on the sample surface in an incident direction deviates significantly even with a small fluctuation in the incidence angle of the illumination.

It is possible to deal with a case in which the line sensor is used as a sensor, but it is not possible to deal with a case in which the point sensor is used.

In order to solve the above-mentioned problems in related art, the invention provides a defect inspection apparatus including a plurality of photoelectric conversion units and a defect inspection method. According to the defect inspection apparatus and the defect inspection method, even for a small height fluctuation with respect to an irradiation position of an illumination and a pixel size, a high-speed and highly sensitive defect detection can be executed by correcting and adding positions of reflected light acquired between different photoelectric conversion units or at different timings and increasing scattered light from a defect.

Solution to Problem

In order to solve the above-mentioned problem, the invention provides a defect inspection apparatus. The defect inspection apparatus includes: an illumination optical system configured to irradiate a sample with an illumination spot; a detection unit configured to detect, from a plurality of directions, reflected light from the sample irradiated with the illumination spot of the illumination optical system; a control unit configured to control a scan of the sample with the illumination spot of the illumination optical system by overlapping a plurality of detection regions such that the detection regions partially overlap, the plurality of detection regions being detected by the detection unit configured to execute a detection from the plurality of directions when the sample is scanned with the illumination spot of the illumination optical system; and a signal processing unit configured to process a signal obtained by detecting the reflected light from the sample by the detection unit to detect a defect. The signal processing unit includes: a data integration unit configured to synthesize an integrated signal by processing the signal detected a plurality of times by overlapping the reflected light of the sample for each detection region by the detection unit; and a defect detection unit configured to detect the defect on a surface of the sample based on the integrated signal synthesized by the data integration unit.

In order to solve the above-mentioned problem, the invention provides a defect inspection method for inspecting a defect on a surface of a sample. The defect inspection method includes: a step of irradiating the sample with an illumination spot; a step of detecting, by a plurality of detection units, from a plurality of directions, reflected light from the sample irradiated with the illumination spot; a step of controlling a scan of the sample with the illumination spot by overlapping detection regions such that the detection regions partially overlap, the detection regions being detected by the plurality of the detection units configured to execute a detection from the plurality of directions when the sample is scanned with the illumination spot; a step of synthesizing, by a data integration unit, an integrated signal by processing signals detected a plurality of times by overlapping the reflected light of the sample for each of the detection regions by the plurality of detection units; and a step of detecting a defect on a surface of the sample by processing, by a defect detection unit, the integrated signal synthesized by the data integration unit.

Advantageous Effect

According to the invention, by detecting the defect based on the signals between the photoelectric conversion units or the signals obtained by correcting a positional deviation between the signals acquired at different timings, an inspection with the high speed, the high sensitivity, and good coordinate accuracy is executed. Problems, configurations and effects other than those described above will clarified with reference to the following description of the embodiments.

BRIEF DESCRIPTION OF DRAWINGS

FIG. 1A is a block diagram showing an overall schematic configuration showing an embodiment of a defect inspection apparatus according to a first embodiment of the invention.

FIG. 1B is a diagram showing an embodiment of the defect inspection apparatus according to the first embodiment of the invention, and is a block diagram showing an internal configuration of an attenuator 3 in FIG. 1A.

FIG. 1C is a diagram showing an embodiment of a defect inspection apparatus according to a second embodiment of the invention, and is a block diagram showing an optical system that detects directly reflected light of an illumination spot.

FIG. 2 is a block diagram of as illumination unit according to the first embodiment of the invention as viewed from a direction perpendicular to a longitudinal direction of a linear illumination region on a sample.

FIG. 3 is a block diagram of the illumination unit according to the first embodiment of the invention as viewed from the longitudinal direction of the linear illumination region on the sample.

FIG. 4 is a plan view of the sample showing a state in which an illumination spot is projected onto the sample according to the first embodiment of the invention.

FIG. 5A is a plan view of a wafer showing a first example showing a locus of the illumination spot obtained by a spiral scan.

FIG. 5B is a plan view of the wafer showing a second example showing a locus of the illumination spot obtained by a translational scan.

FIG. 6 is a graph showing an illumination profile in an S2 direction showing an influence of a positional deviation of the illumination spot in the S2 direction in a plurality or scans on a defect detection and a defect position calculation.

FIG. 7A is a side view of the sample viewed from a direction perpendicular to the S2 direction, which shows an influence of a fluctuation of the sample in a height direction on an illumination spot position.

FIG. 7B is a side view of the sample viewed from the direction perpendicular to the 32 direction, which shows an influence of a fluctuation in an incidence angle in a major axis direction of the illumination spot of the illumination on an illumination spot position on a surface of the sample.

FIG. 7C is a side view of the sample viewed from a direction perpendicular to an S1 direction, which shows an influence of a fluctuation in an incidence angle in a minor axis direction of the illumination spot of the illumination on the illumination spot position on the surface of the sample.

FIG. 8 is a plan view of the sample showing a deviation of the illumination spot position in the minor axis direction of the illumination spot of the illumination in different illumination spot light scans.

FIG. 9 is a block diagram showing a schematic configuration of a signal processing unit according to the first embodiment of the invention.

FIG. 10A is a block diagram showing an arrangement of a detection unit according to a third embodiment of the invention.

FIG. 10B is an example of sensor output signal waveforms corresponding to the amount of light detected corresponding to a position in the S1 direction acquired by four oblique detection systems when a position of the illumination spot deviates between different scans and an example of an added signal waveform obtained by adding the sensor output signal waveforms according to the third embodiment of the invention.

FIG. 11 is a diagram of wave signal waveforms when the sensor output signal waveforms are divided into certain sections and a maximum value of signals in each section is expressed as a peak value representing the section and a signal waveform showing a signal waveform obtained by adding the wave signal waveforms according to the third embodiment of the invention.

FIG. 12A is a flow chart showing a flow of signal processing according to the third embodiment of the invention.

FIG. 12B is a block diagram showing a schematic structure of a signal integration unit according to the third embodiment of the invention.

FIG. 13 is a graph showing a correlation value between two pieces of waveform data for each position in the S1 direction according to a fourth embodiment of the invention.

FIG. 14 is a diagram showing a sensor output signal waveform according to the fourth embodiment of the invention, shows an example of sensor output signal waveforms showing an effect of correcting a position deviation between the sensor output signal waveforms in different scans when the position deviation of the illumination spot occurs between the different scans, and shows an example of an added signal waveform obtained by adding the sensor output signal waveforms.

FIG. 15A is a flow chart showing a flow of signal processing according to the fourth embodiment of the invention.

FIG. 15B is a block diagram showing a schematic configuration of a signal integration unit according to the fourth embodiment of the invention.

FIG. 16 is a partial plan view of a sample showing a position deviation of the illumination spot on the sample according to the first embodiment of the invention.

FIG. 17A is a diagram showing an arrangement of the optical system according to the first embodiment of the invention.

FIG. 17B is a diagram showing an arrangement of the optical system according to the first embodiment of the invention, and is a view taken along a line A-A in FIG. 17A.

FIG. 18 is a block diagram showing a configuration of a detection optical system according to a fifth embodiment of the invention.

FIG. 19A is a perspective view showing a schematic configuration of a sensor unit and showing an imaging method of the sensor unit according to the fifth embodiment of the invention.

FIG. 19B is a perspective view showing relation between a sample and an objective lens and showing an image separation state of a sample surface according to the fifth embodiment of the invention.

FIG. 20 is a block diagram showing an internal circuit configuration of a photoelectric conversion unit according to the fifth embodiment of the invention.

FIG. 21 is a block diagram of a detection optical system showing a position deviation of a sample on a sensor surface due to a deviation of the sample in a Z direction according to the fifth embodiment of the invention.

FIG. 22A is a plan view of a sample showing a method for integrating images obtained by different scans according to the fifth embodiment of the invention.

FIG. 22B is a diagram showing outputs of eight pixels in the S2 direction obtained by the different scans according to the fifth embodiment of the invention.

FIG. 22C a figure showing two-dimensional image data acquired by the different scans according to the fifth embodiment of the invention.

FIG. 22D is a diagram showing two-dimensional image data showing a state in which the sample is deviated by $\Delta S1$ in the S1 direction and is deviated by $\Delta S2\_1$ in the S2 direction between two-dimensional image data acquired by a detection unit 102-13 by the different scans according to the fifth embodiment of the invention.

FIG. 22E is a diagram showing two-dimensional image data showing a state in which the sample is deviated by $\Delta S1$ in the S1 direction and is deviated by $\Delta S2\_3$ in the S2 direction between two-dimensional image data acquired by a detection unit 102-11 by the different scans according to the fifth embodiment of the invention.

FIG. 23 is a block diagram showing a schematic configuration of a detection optical system according to a sixth embodiment of the invention.

FIG. 24 is a front view of an aperture mirror according to the sixth embodiment of the invention.

FIG. 25 is a front view of a TDI sensor showing a position fluctuation of an image on the TDI sensor according to the sixth embodiment of the invention.

DESCRIPTION OF EMBODIMENTS

A defect inspection apparatus according to the invention includes a sample holding portion that holds a sample to be inspected, an illumination optical system that irradiates the sample held by the sample holding portion with light having a predetermined wavelength, a detection optical system that includes photoelectric conversion units, that condenses light reflected from the sample irradiated with the light, and that guides the light to the photoelectric conversion units, and a data processing unit that processes signals output from the photoelectric conversion units detecting the reflected light and that extracts position information of a foreign matter or a defect on the sample. The data processing unit obtains, based on the light reflected from the sample to be inspected, a deviation of an optical axis of an illumination spot, a deviation of a detected image on a photoelectric conversion surface due to a displacement of the sample to be inspected in a height direction, or a deviation of a detection timing, and detects the defect based on a signal strength between the photoelectric conversion units or signals in which a timing deviation between the signals acquired at different timings is corrected. The data processing unit executes an inspection with a high speed, a high sensitivity, and good coordinate accuracy by detecting the defect based on the signals between the photoelectric conversion units and the signals in which the position deviation between the signals acquired at the different timings is corrected.

Embodiments of the invention will be described below with reference to drawings. The invention is not limited to the embodiments described below and includes various modifications. The embodiments described below are described in detail for easy understanding of the invention, and the invention is not necessarily limited to including all configurations described below. A part of a configuration according to a certain embodiment can be replaced with another embodiment, and a configuration according to a certain embodiment can be added to another embodiment. A part of the configuration according to the embodiments may be added, deleted, or replaced with another configuration.

The following embodiments describe a case in which the invention is applied to an inspection apparatus used for a defect inspection executed in a manufacturing process of a semiconductor or the like. By using the defect inspection apparatus according to the invention, (1) a detection of a minute defect,
(2) a highly accurate measurement of dimensions of the detected defects,
(3) an acquisition of a substantially constant inspection result regarding the number, a position, the dimension, and a defect type of the detected defect,
(4) an inspection of a large number of samples within a certain period of time and the like can be executed.

First Embodiment

FIG. 1 is an example of a schematic configuration diagram of a defect inspection apparatus 100 according to the present embodiment. The defect inspection apparatus 100 according to the present embodiment inspects defects such as a foreign matter and a hollow on a surface of a sample 1 with no pattern formed on the surface. The defect inspection apparatus 100 includes an illumination unit 101, detection units 102-1 to 102-3, sensor units 103-1 to 103-3 that photoelectrically convert light condensed by detection units, a stage 104 that allows a wafer, which is the sample 1, to be placed, a sensor unit 102-35 that photoelectrically converts light condensed by the detection unit 102-3 condensing light reflected from the sample 1 irradiated by the illumination unit 101, a signal processing unit 5200, a control unit 53, a display unit 54, and an input unit 55. A case will be described in which a sample having a flat surface and having no pattern formed on the surface is used as the sample 1.

The illumination unit 101 appropriately includes a laser source 2, an attenuator 3, an outgoing beam adjustment unit 4, a beam expander 5, a polarization control unit 6, and a condensing optical unit 7. The detection unit 102-3 is also used as a condensing unit for illumination light when light is incident from a normal direction of the sample 1.

The sensor units 103-1 to 103-3 are point sensors, and each includes a photomultiplier tube or a silicon photomultiplier tube (SiPM) that photoelectrically converts weak signals with a high gain. As the sensor unit 102-35, a two-dimensional CCD sensor, a CMOS sensor, or a position sensing detector (PSD) is used.

The signal processing unit 5200 includes a memory unit 521, a signal integration unit 522, and a defect detection unit 523. Data photoelectrically converted by the sensor units 103-1, 103-2, and 103-3 is subjected to a predetermined sampling and an analog-to-digital conversion, and then scattered light data is stored in the memory unit 521. The signal integration unit 522 executes an integration calculation between data having different illumination spot positions in the same sensor and an integration calculation between the different sensors, and extracts a high-frequency and high-luminance portion in data obtained by executing the integration calculations as a defect.

A laser beam emitted from the laser source 2 is adjusted to a desired beam intensity by the attenuator 3, is adjusted to a desired beam position and beam traveling direction by the outgoing beam adjustment unit 4, is adjusted to a desired beam diameter by the beam expander 5, is adjusted to a desired polarization state by the polarization control unit 6, and illuminates an inspection target region of the sample (wafer) 1.

An incidence angle (an angle of inclination with respect to the normal direction of the surface of the sample) of illumination light with respect to the surface of the sample 1 is determined by positions and angles of reflecting mirrors 80 and 82 provided in an optical path of the illumination unit 101. An incidence angle of an optical axis 120 of the illumination light is set to an angle suitable for detecting the minute defect. A reference numeral 81 denotes an adjusting mechanism portion that adjusts the angle of the reflecting mirror 80.

The larger an illumination incidence angle is, that is, the smaller an illumination elevation angle (an angle between the surface of the sample and an illumination optical axis) is, the weaker scattered light (called haze) from minute irregularity on the surface of the sample 1, which is a noise, is with respect to scattered light from a minute foreign matter on the surface of the sample 1. Therefore, the illumination incidence angle is suitable for detecting the minute defect. Therefore, when the scattered light from the minute irregularity on the surface of the sample 1 hinders a detection or a minute defect, the incidence angle of the illumination light on the surface of the sample 1 is preferably set to 75 degrees or more (the elevation angle is preferably set to 15 degrees or less).

On the other hand, in an oblique incidence illumination, the smaller the illumination incidence angle, the larger an absolute amount of the scattered light from the minute foreign matter. Therefore, when an insufficient amount of scattered light from the defect hinders the detection of the minute defect, the incidence angle of the illumination light is preferably set to 60 degrees or more and 75 degrees or less (the elevation angle is preferably set to 15 degrees or more and 30 degrees or less).

When the oblique incidence illumination is performed, polarized light of the illuminating is set to p-polarized light under a polarization control executed by the polarization control unit 6 of the illumination unit 101, so that the scattered light from the defect on the surface of the sample 1 increases as compared with other polarized light. When the scattered light from the minute irregularity on the surface of the sample 1 hinders the detection of the minute defect, the polarized light of the illuminating is set to an s-polarized light, so that the scattered light from the minute irregularity on the surface of the sample 1 decreases as compared with other polarized light. The polarized light of the illuminating may be set to 45 degrees polarized light, which is between P and S, or circular polarized light.

The reflecting mirror 82 can be taken in and out of the optical path by being moved up and down in an arrow direction using a drive mechanism (not shown). When the reflecting mirror 82 is removed from the optical path, the illumination light emitted from the polarization control unit is vertically incident on the sample 1 via a reflecting mirror 83, a polarization beam splitter 84, a polarization control unit 85, and the detection unit 102-3. The detection unit 102-3 includes a reflecting mirror 102-33 at a pupil portion of the detection unit 102-3.

Similar to the polarization control unit 6 described later, the polarization control unit 85 includes a ¼ wave plate 851 and a ½ wave plate 852, and can control any polarized light. Under a condition that the reflecting mirror 82 is removed from the optical path and the illumination is vertically incident, the polarization control unit 85 executes setting such that the illumination light is incident on the detection unit 102-3 with the circular polarized light.

An optical path of light reflected on the surface of the sample 1 branches by the reflecting mirror 102-33. The reflected light from the sample 1 reflected from the reflecting mirror 102-33 toward the polarization control unit 85 is converted into linearly polarized light by the ¼ wave plate 851 of the polarization control unit 85, is guided to an imaging lens 102-34 by the polarization beam splitter 84, and is detected by the sensor unit 102-35.

FIGS. 17A and 17B show a more detailed configuration of the detection unit 102-3. FIG. 17B is a cross-sectional view taken along a line A-A in FIG. 17A as seen in direction of an arrow. A reference numeral 102-31 denotes an objective lens and a reference numeral 102-32 denotes an imaging lens. A reference numeral 20 denotes the illumination spot of the illumination light applied to the surface of the sample 1, and the illumination spot has a linear intensity distribution. The reflecting mirror 102-33 has a shape that is long in a minor axis direction of an illumination spot 20 and that is short in a major axis direction. The reflected light incident on the reflecting mirror 102-33 from the sample 1 is guided to the polarization control unit 85, and the other light (the reflected light that has passed around the reflecting mirror 102-33) is incident on the imaging lens 102-32.

Under an oblique illumination condition with the reflecting mirror 82 inserted in the optical path, the polarization control unit 85 executes a control such that main reflected light from the surface of the sample 1 is guided to the imaging lens 102-34 by the polarization beam splitter 84. When the polarized light of the illumination light having the optical axis 120 incident on the sample 1 from the reflecting mirror 80 is the P-polarized light, an angle of a fast axis of the ½ wave plate 852 is set such that light in a polarization direction of the major axis direction S2 of the illumination spot 20 shown in FIG. 17B is guided to the imaging lens 102-34.

On the other hand, when the polarized light of the illumination light having the optical axis 120 incident on the sample 1 is the s-polarized light, the polarized light in a direction orthogonal to S2 is controlled to be guided to the imaging lens 102-34. With this setting, the sensor unit 102-35 monitors the illumination spot 20 on the surface of the sample 1.

In order to detect the minute defect near the surface of the sample 1, a high-power light source is used as the laser source 2. The high-power light source oscillates an ultraviolet or vacuum ultraviolet laser beam having a short wavelength (a wavelength of 355 nm or less) as a wavelength with which the ultraviolet or vacuum ultraviolet laser beam is less likely to penetrate an inside of the sample 1, and has an output of 2 W or more. A diameter of an outgoing beam is approximately 1 mm. In order to detect a defect inside the sample 1, a light source that oscillates a visible or infrared laser beam is used. The visible or infrared laser beam has a wavelength with which the visible or infrared laser beam is likely to penetrate the inside of the sample 1.

As shown in FIG. 1B, the attenuator 3 appropriately includes a first polarizing plate 31, a ½ wave plate 32 rotatable around an optical axis of the illumination light, and a second polarizing plate 33. Light incident on the attenuator 3 is converted to the linearly polarized light by the first polarizing plate 31, a polarization direction is rotated to any direction in accordance with an azimuth angle of a slow axis of the ½ wave plate 32, and the light passes through the second polarizing plate 33.

Light intensity is dimmed at any ratio by controlling the azimuth angle of the ½ wave plate 32. When a degree of a linear polarization of the light incident on the attenuator 3 is sufficiently high, the first polarizing plate 31 is not necessarily required. As the attenuator 3, an attenuator is used in which relation between an input signal and a dimming rate pre-calibrated. As the attenuator 3, it is possible to use an ND filter having a gradation density distribution and to switch and use a plurality of ND filters having a plurality of densities different from one another.

The outgoing beam adjustment unit 4 includes a plurality of reflecting mirrors 41 and 42. Here, an embodiment in a case of including two reflecting mirrors 41 and 42 will be described. However, the invention is not limited thereto, and three or more reflecting mirrors may be appropriately used. Here, a three-dimensional orthogonal coordinate system (XYZ coordinates) is tentatively defined, and it is assumed that light incident on the reflecting mirror 41 travels in a +X direction.

The reflecting mirror 41 is provided so as to deflect the incident light in a +Y direction (incident and reflection in an XY plane), and the reflecting mirror 42 is provided so as to deflect light reflected by the reflecting mirror 41 in a +Z direction (incident and reflection in an YZ plane). Each of the reflecting mirrors 41 and 42 adjusts a position and a traveling direction (angle) of light emitted from the outgoing beam adjustment unit 4 by performing a translation and a tilt angle adjustment using a mechanism (not shown).

As described above, by arranging an incident and reflecting surface (XY plane) of the reflecting mirror 41 and an incident and reflecting surface (YZ plane) of the reflecting mirror 42 such that the incident and reflecting surface (XY plane) of the reflecting mirror 41 and the incident and reflecting surface (YZ plane) of the reflecting mirror 42 are orthogonal to each other, a position and an angle of the light (traveling in the +Z direction) emitted from the outgoing beam adjustment unit 4 in an XZ lane and a position and an angle of the light in the YZ plane can be adjusted independently.

The beam expander 5 includes two or more groups of lenses 51 and 52 and has a function of expanding a diameter of an incident parallel light beam. For example, a Galileo-type beam expander including a combination of a concave lens as the lens 51 and a convex lens as the lens 52 is used. The beam expander 5 is provided on a translational stage having two or more axes (not shown), and a position of the beam expander 5 is adjustable such that a center coincides with a position of a predetermined beam. A tilt angle adjustment function for the entire beam expander 5 is provided such that an optical axis of the beam expander 5 and an optical axis of the predetermined beam coincide with each other.

A magnification of a diameter of a light beam is controllable by adjusting an interval between the groups of the lenses 51 and 52 (zoom mechanism). When light incident on the beam expander 5 is not parallel, the magnification of the diameter and a collimation (quasi-parallelization of the light beam) of the light beam are simultaneously performed by adjusting the interval between the groups of the lenses 51 and 52. The collimation of the light beam may be performed by providing a collimator lens upstream of the beam expander 5 and independently of the beam expander 5. The magnification of a beam diameter caused by the beam expander 5 is approximately 5 times to 10 times, and a beam diameter of 1 mm of a beam emitted from a light source is magnified to approximately 5 mm to 10 mm.

The polarization control unit 6 includes a ½ wave plate 61 and a ¼ wave plate 62, and controls a polarization state of the illumination light to be any polarization state.

FIGS. 2 and 3 are schematic views of positional relation between the optical axis 120 of the illumination light guided from the illumination unit 101 to the surface of the sample 1 and an illumination intensity distribution shape. A configuration of the illumination unit 101 in FIGS. 2 and 3 shows a part of the configuration of the illumination unit 101 described with reference to FIG. 1A, and the outgoing beam adjustment unit 4, the reflecting mirror 82, a adjusting mechanism portion 81, and the like described with reference to FIG. 1A are omitted.

FIG. 2 shows a schematic cross-sectional view of an incidence plane (a plane including the optical axis 120 of the illumination light and a normal of the surface of the sample 1) in the oblique incidence illumination. In the incidence plane, the oblique incidence illumination is inclined with respect to the surface of the sample 1. A substantially uniform illumination intensity distribution is formed by the illumination unit 101 in the incidence plane. As shown in a schematic illumination intensity distribution diagram 1201 on a right side of FIG. 2, an illumination intensity has a Gaussian intensity distribution in a linearly illuminated region on the surface of the sample 1, and a length of a beam width L1 defined at 13.5% of a peak is approximately 25 μm to 4 mm.

FIG. 3 shows a schematic cross-sectional view of a plane that includes the normal of the surface of the sample 1 and that is perpendicular to the incidence plane in the oblique incidence illumination. In the plane, an illumination intensity distribution on the surface of the sample 1 is formed as shown in a schematic illumination intensity distribution diagram 1202 on a right side of FIG. 3. In the illumination intensity distribution, a peripheral intensity is weak with respect to a center. More specifically, the illumination intensity distribution is a Gaussian distribution that reflects an intensity distribution of light incident on the condensing optical unit 7, or an intensity distribution similar to a first-type first-order Bessel function or a sinc function that reflects a shape of an aperture of the condensing optical unit 7.

In order to reduce a haze generated from the surface of the sample 1, a length (a length of a region with an illumination intensity of 13.5% or more of a maximum illumination intensity) L2 of the illumination intensity distribution in the plane is shorter than a length of a part where an illumination intensity on the incidence plane is uniform, and is approximately 1.0 μm to 20 μm.

With reference to FIGS. 4 and 5A, an illumination distribution shape (the illumination spot 20) formed on the surface of the sample 1 by the illumination unit 101 and a sample scanning method will be described. A circular semiconductor silicon wafer is assumed as the sample 1. The stage 104 includes a translation stage, a rotation stage, and a Z stage that allows a height of the sample surface to be adjusted (all not shown).

As shown in FIG. 4, the illumination spot 20 has an illumination intensity distribution in which the illumination spot 20 is long in one direction as described above. The direction is defined as S2 (a direction of L1 in FIG. 2), and a direction substantially orthogonal to S2 is defined as S1 (a direction of L2 in FIG. 3). A scan is performed in a circumferential direction S1 of a circle centered on a rotation axis of the rotation stage by a rotational movement of the rotation stage constituting the stage 104 and in a translation direction 52 of the translation stage by a translational movement of the translational stage.

As shown in FIG. 5A, when the sample 1 is continuously rotated, the illumination spot 20 draws a spiral locus T1 on the sample 1 by scanning the sample 1, in a scanning direction S2, by a distance equal to or smaller than a length of the illumination spot 20 in a longitudinal direction during one rotation of the sample 1, and an entire surface of the sample 1 is scanned.

FIG. 5B shows a scan of the illumination spot 20 in a configuration in which a two-axis translational stage is provided instead of the rotation stage. By scanning the two-axis translational stage in the direction S1, the illumination spot 20 scans a sample surface in the direction S1 in a strip shape with the length of the illumination spot at a constant speed. By repeatedly moving the translational stage in the direction S2 at an end of the sample 1 by a scanning width, repeatedly moving a detection region, and repeatedly performing the scan at a constant speed in a direction opposite to the direction S1, a locus T2 is drawn and the entire surface of the sample 1 is scanned.

FIG. 6 shows a processing example of the signal processing unit 5200. Here, an example of a state is shown in which the reflecting mirror 82 is inserted. A waveform 201 and a waveform 202 are illumination profiles of the sample 1. An X direction indicates the S2 direction and a Y direction indicates the amount of light. The waveform 201 and the waveform 202 are illumination profiles that are expected to be obtained by causing the illumination spot 20 to perform scans at the same position in the S1 direction and adjacent scans in the S2 direction when the spiral scan is performed by the illumination spot 20 as shown in FIG. 5A. In this ideal state, a pitch between peaks of the waveform 201 and the waveform 202 is 2P.

However, in reality, due to a vibration of the illumination unit 101, the condensing optical unit 7, the reflecting mirror 80, or the sample 1, a position of the illumination spot 20 (illumination position) on the surface of the sample 1 is not necessarily at an assumed position and deviates by ΔS2 from an expected illumination position where the pitch between the peaks of the waveform 201 and the waveform 202 is 2P, and a profile such as a waveform 203 is obtained.

Here, if there is a defect at a position of 204, a detected light amount of 205 is expected in the scan with an illumination of the waveform 201, and a light amount of 206 is expected in a scan of the waveform 202. However, the light amount changes to 207, which is obtained by reducing the light amount by ΔI due to the deviation ΔS2 of the illumination spot.

FIGS. 7A and 7B show a mechanism of occurrence of a deviation of the illumination in the S2 direction. A principal ray (optical axis) 120 of the illumination light is incident on the sample 1 at a shallow elevation angle. Therefore, when the sample 1 is displaced to a position 11 by ΔZ from an expected value of the sample surface in the normal direction, the illumination spot 20 moves to a position of an illumination spot 21. At this time, a defect 15 is illuminated at a position 16. Since the illumination spot 21 moves with respect to the illumination spot 20 in the S2 direction, the amount of the scattered light changes.

A reference numeral 121 in FIG. 7B denotes a principal ray deviated from the optical axis 120 of expected illumination light due to the vibration generated in the reflecting mirror 80. The illumination spot at this time is denoted by reference numeral 22, and the amount of light of the defect 15 changes.

Here, when the amounts of light of the waveforms 205 and 206 in FIG. 6 are represented by I205 and I206, respectively, a position of a defect in the S2 direction from a midpoint of profile peak centers of waveform 201 and waveform 202 is represented by X, and a distance between the peak centers is represented by 2P, a following formula is satisfied.

[Math 1]

$$I205 = I\exp\left(-\frac{(-P-X)^2}{2(L1/4)^2}\right) \quad \text{(Formula 1)}$$

[Math 2]

$$I206 = I\exp\left(-\frac{(P-X)^2}{2(L1/4)^2}\right) \quad \text{(Formula 2)}$$

In the formula, I represents the amount of the scattered light from the defect.

Based on (Formula 1) and (Formula 2), a defect position is obtained as shown in (Formula 3) below.

[Math 3]

$$X = -\frac{(L1/4)^2}{2P}(\log I205 - \log I206) \quad \text{(Formula 3)}$$

The amount of the scattered light I from the defect can be obtained as in (Formula 4) based on (Formula 2) and (Formula 3).

[Math 4]

$$I = I205\exp\left(\frac{(-P-X)^2}{2(L1/4)^2}\right) \quad \text{(Formula 4)}$$

In the formula, the actually obtained amount of light is the amount of light I207 corresponding to 207 in FIG. 6, and an error is present in the position of the defect obtained in (Formula 4). The amount of the scattered light from the defect is lower than an actual amount, and a defect detection sensitivity is reduced.

In order to reduce a variation in defect coordinate accuracy and a sensitivity, it is essential that the illumination position is stable. However, in order to increase a capture rate of the scattered light from the defects, the detection units 102-1 to 102-3 are required to be close to the sample 1, an optical path from the reflecting mirror 80 to the sample 1 becomes long, and it is difficult to stabilize the illumination position. In order to execute a high-speed scan, it is also difficult to apply an auto focus (AF) mechanism that keeps a working distance between the sample 1 and the detection units 102-1 to 102-3 constant.

As countermeasure, the deviation amount ΔS2 is observed, and if a fluctuation amount of the deviation amount ΔS2 is large and the illumination position is not stable, the variation in the sensitivity and the defect coordinate accuracy are stabilized. At this time, a position of a defect candidate to be calculated is expressed by a following formula.

[Math 5]

$$X2 = -\frac{(L1/4)^2}{2P + \Delta S2}(\log I205 - \log I207) + \Delta S2/2 \quad \text{(Formula 5)}$$

The amount of scattered light from the defect candidate is expressed by a following formula.

[Math 6]

$$I = I205\exp\left(\frac{(-P-X2)^2}{2(L1/4)^2}\right) \quad \text{(Formula 6)}$$

The deviation of the principal ray of the illumination light in the S1 direction will be described with reference to FIG. 7C. In the illumination spot 20, the S1 direction is the minor axis direction of the illumination spot 20, and the deviation of illumination has a great influence on the sensitivity. A reference numeral 122 in FIG. 7C denotes the optical axis of the illumination light deviated from the expected optical axis 120 of the illumination light due to influences of a vibration, a change in a refractive index caused by a shaking of air, and the like, and the illumination spot at this time is denoted by a reference numeral 23.

As shown in FIG. 8, an illumination spot 23 is an illumination spot that follows the illumination spot 20 and that is expected to be at the same position in the S1 direction in a scan after one rotation of the sample 1, but illuminates the sample 1 at a position deviated from the expected position. When the defect candidate is near a middle of the illumination spot 20 and the illumination spot 23, it is necessary to obtain the amount of the scattered light from the defect using data of both the illumination spot 20 and the illumination spot 23. However, if there are deviations between the positions of both spots at this time, the amount of the scattered light decreases.

As a solution to this problem, a position deviation amount of the illumination spot is obtained based on a position of illumination spot light imaged by the sensor unit 102-35, a timing deviation when reflected light in a predetermined region is detected can be obtained, data in which reflected light in a desired region is detected is specified from an obtained data string, and a plurality of pieces of data obtained by different spiral scans are integrated.

The solution will be described with reference to FIG. 16. In FIG. 16, a reference numeral 102-3501 shows an image obtained by taking a picture with the sensor unit 102-35, a reference numeral 102-3502 shows an expected position of the illumination spot, and a reference numeral 102-3503 shows an image of the scattered light from the minute irregularity on the surface of the sample 1, that is, a haze image. A position of the haze image 102-3503 is obtained based on the image 102-3501 taken by the sensor unit 102-35 using a method such as calculating a center or gravity, and deviation amounts ΔS1 and ΔS2 from the expected position 102-3502 of the illumination spot in the S1 and S2 directions are obtained.

As shown in FIG. 8, when the sample 1 is scanned by the illumination spot 20 in the S1 direction at a velocity V1 while the sample 1 is rotated, for data acquired at the expected position in the S1 direction, data whose time deviates by ΔS1/V1 is used. That is, if a sampling interval is ΔT, data deviated by ΔS1/V1/ΔT is used. Using the deviated data, a position in the S1 direction is determined based on a formula (Formula 5), a candidate position of the defect is obtained, and the amount of the scattered light is obtained using (Formula 6).

FIG. 9 shows a block diagram of data processing processed by the signal processing unit 5200. Signals output from sensors 103-A to 103-N are input to a bandpass filter 520 to remove a haze component, and data is stored in the memory unit 521. Reference numerals 521A to 521N denote blocks corresponding to the sensors A to N, respectively, reference numerals 521Aa to 521Am show data for a to m spiral scans of the sensor A, and reference numerals 521Na to 521Nm show data for a to m spiral scans of the sensor N.

Reference numerals 5220α to 5220γ of the signal integration unit 522 denote inter-sensor integration units, and synthesize a linear sum signal obtained by multiplying each signal of the sensors A to N stored in the memory unit 521 by a predetermined gain. Reference numerals 5220αa to 5220αm and reference numerals 5220γa to 5220γm denote data for the a to m scans synthesized using a predetermined gain set α and a gain set γ, respectively.

Reference numerals 5222 denotes a deviation amount calculation unit that calculates and records ΔS1 and ΔS2 of each scan calculated based on the data captured by the sensor unit 102-35, and the calculated data of the deviation amount of each of the a to m scans is stored in memories 5222a to 5222m.

In the defect position and light amount calculation units 5221α to 5221γ, data corresponding to the deviation ΔS1 in the S1 direction from an expected position 120-3502 of the illumination spot calculated and stored in the deviation amount calculation unit 5222 is received from the inter-sensor integration units 5220α to 5220γ. Based on a deviation amount of ΔS2, the position of the defect candidate and the amount of light are calculated using (Formula 5) and (Formula 6).

A reference numeral 523 denotes a defect detection unit and determines that there is a defect when any of the mount of light of defect candidates calculated by the light amount calculation units 5221α to 5221γ exceeds a threshold value set for each gain set, and information on the amount of light of the defect and a position where the defect is detected are output to the control unit 53.

In the present embodiment, an example is used in which a two-dimensional sensor is used as the sensor unit 102-35, but a one-dimensional sensor may be used as appropriate. When a one-dimensional sensor is used, the sensor is used for correction only in the S1 direction or correction only in the S2 direction. Alternatively, an implementation is used in which two one-dimensional sensors are applied, that is, one one-dimensional sensor acquires correction information in the S1 direction, and the other one-dimensional sensor acquires correction information in the S2 direction. Accordingly, processing equivalent to that using a two-dimensional sensor can be executed.

According to the present embodiment, even if the illumination position fluctuates when the sample spirally scanned with the illumination light it is possible to stabilize a variation in the defect detection sensitivity and a defect coordinate system to reliably detect the minute defect on the surface of the sample by obtaining a position deviation of the illumination spot on the sample, obtaining the timing deviation when the reflected light from the predetermined region is detected, and integrating the data in which the reflected light from the predetermined region is detected.

Second Embodiment

Based on the configuration described is the first embodiment, in order to stably detect the illumination spot even when the amount of the light of the illumination spot is small due to an oblique illumination, directly reflected light or a position close to the reflected light is stably detected instead of the sensor unit 102-35 detecting reflected light from a vertical direction.

An illumination spot detection optical system according to the present embodiment is shown in FIG. 1C. Since configurations other than the illumination spot detection optical system are the same as those described in the first embodiment, the description thereof will be omitted.

In the illumination spot detection optical system according to the present embodiment shown in FIG. 1C, a configuration of the illumination spot detection optical system on an illumination side is the same as that described in the first embodiment, and includes a condenser lens 91, an imaging lens 92, and a two-dimensional sensor 93 instead of the imaging lens 102-34 and the sensor unit 102-35 described in the first embodiment.

In a configuration shown in FIG. 1C, a reference numeral 120 denotes an illumination optical axis guided to a surface of the sample 1 from the illumination unit 101 described in the first embodiment. Reflected light directly reflected on the surface of the sample 1 is incident on the condenser lens 91 and is condensed. The reflected light from the surface of the sample 1 condensed by the condenser lens 91 is incident on the imaging lens 92 and is imaged on the two-dimensional sensor 93.

An output of the two-dimensional sensor 93 is output to the signal integration unit 522 in FIG. 1A, as in the case according to the first embodiment. The two-dimensional sensor 93 measures an illumination spot position and acquires correction information as in the case of using the sensor unit 102-35.

According to the present embodiment, even when the amount of the light of the illumination spot is small due to the oblique illumination, the illumination spot 20 on the surface of the sample 1 can be stably detected, and the same effect as in the case of the first embodiment can be achieved.

Third Embodiment

In a configuration described with reference to FIG. 1 in the first embodiment, the detection units 102-1 and 102-2 that detect scattered light scattered obliquely from the sample 1 are provided. In the present embodiment, as shown in FIG. 10A, a detection system includes four oblique detection systems 102M1 to 102M4. On the other hand, the imaging lens 102-34 and the sensor unit 102-35 that monitor the illumination spot 20 on a surface of the sample 1 have been removed. Each of the four oblique detection systems 102M1 to 102M4 has the same configuration as those of the detection units 102-1 and 102-2 described in the first embodiment.

In FIG. 10A, a reference numeral 120 denotes an illumination optical axis guided to the surface of the sample 1 by the illumination unit 101 described in the first embodiment. The four oblique detection systems 102M1 to 102M4 are provided at positions where specular reflection light from the surface of the sample 1 due to illumination light guided from the illumination unit 101 to the surface of the sample 1 is not incident. The detection system includes four oblique detection systems 102M1 to 102M4, and a configuration is the same as that according to the first embodiment except that the imaging lens 102-34 and the sensor unit 102-35 that monitor the illumination spot 20 on the surface of the sample 1 are removed, and except for a configuration of a signal integration unit 522-1. Therefore, the descriptions thereof will be omitted.

A table 1020 in FIG. 10B shows in a list format a graph of relation between the S1 direction position and signal light amount obtained by each detection system for each sensor unit when the illumination spot 20 scans the sample 1 in the S1 direction while the sample 1 is rotated, and a graph in which outputs of sensors are added.

In FIG. 10B, there is a defect in a portion shown in a section 10000, and it is required to distinguish this defect from other noise. In each graph, waveforms 10001 to 10004 represented by solid lines are the amount of light obtained during a jth spiral scan, and are data obtained by the four oblique detection systems 102M1 to 102M4. On the other hand, waveforms 10005 to 10008 represented by dotted lines are similarly the amount of light obtained during a j+1th spiral scan acquired by the oblique detection systems 102M1 to 102M4. An X direction represents a position (coordinates) in the S1 direction. During the jth and j+1th scans, a position deviation in the S1 direction occurs due to a fluctuation of an illumination.

In a bottom graph in FIG. 10b, a waveform 10009 represented by a solid line is a waveform of added data obtained by adding the waveforms 10001 to 10008. On the other hand, a waveform 10010 represented by a dotted line is an added waveform expected when no position deviation occurs during the jth and j+1th scans. A comparison of the waveform 10009 and the waveform 10010 shows that the fluctuation of the illumination significantly reduces the amount of light from the defect. In the first embodiment, in order to reduce an influence of this deviation, the deviation in the S1 direction is measured using a detection image captured by the sensor unit 102-35 that has detected scattered light from the sample 1 in a vertical direction, and the deviation is corrected. In the present embodiment, a method of reducing a decrease in the amount of light without measuring the scattered light from the sample 1 in the vertical direction will be described.

A graph showing an example of data to which a filter is applied is shown in a table 1010 in FIG. 11. The filter outputs a maximum value of a predetermined section obtained based on the graphs shown in FIG. 10B. In FIG. 11, waveforms 10101 to 10104 represented by solid lines are waveforms obtained by executing processing of replacing the waveforms 10001 to 10004 with the maximum value within the predetermined data sampling section in the S1 direction, respectively. The waveforms 10001 to 10004 are the data for a jth scan acquired respectively by the four oblique detection systems 102M1 to 102M4 described in FIG. 10B. The predetermined section is a section equivalent to a maximum deviation width of a deviation of the optical axis 120 of illumination light predicted in advance.

On the other hand, waveforms 10105 to 10108 represented by dotted lines are waveforms obtained by processing the waveforms 10005 to 10008 in the same manner as in the case of the waveforms 10101 to 10104. The waveforms 10005 to 10008 are data for the j+1th scan acquired respectively by the four oblique detection systems 102M1 to 102M4 described with reference to FIG. 10B.

In a bottom graph of a table 1010 in FIG. 11, a waveform 10109 represented by a solid line is a signal waveform of added data obtained by adding the waveforms 10101 to 10108. A waveform 10010 represented by a broken line is an added data signal waveform expected when no position deviation occurs during the jth and j+1th scans.

The added waveform 10109 represented by the solid line and the added waveform 10010 represented by the broken line have the same peak value in the section 10000. This method has a side effect of increasing a peak value of a noise in a section without a defect other than the section 10000 where the defect is present.

In order to minimize the side effect, it is important to increase a signal value for the noise as much as possible before executing a replacement with the maximum value in the predetermined section. Therefore, the waveforms obtained by the plurality of detection systems are added and integrated, and then the added and integrated waveform is replaced with the maximum value in the predetermined section. In the present addition and integration, as shown by the signal integration unit 522 in FIG. 9, the side effect can be further reduced by appropriately multiplying the signal by a predetermined gain for each sensor.

FIG. 12A shows a flow of signal processing according to the present embodiment, and FIG. 12B shows a configuration of a signal integration unit 522-1 according to the present embodiment. In the present embodiment, first, the rotating sample 1 mounted on the stage 104 is irradiated with the illumination light from the illumination unit 101 described in the first embodiment. Reflected light from the sample 1 irradiated with the illumination light is detected by the four oblique detection systems 102M1 to 102M4 to obtain the waveforms 1001 to 1004 of the four oblique detection systems 102M1 to 102M4 during the jth scan shown in the table 1020 in FIG. 10B and the waveforms 1005 to 1008 of the four oblique detection systems during the j+1th scan (S301).

Next, an added data creation unit 52201 of the signal integration unit 522-1 of the signal processing unit 5200 shown in FIG. 12B executes integrated processing of adding the waveforms 1001 to 1004 and the waveforms 1005 to 1008 to obtain the waveform 10009, which is the added data in a bottom column of the table in FIG. 10B (S302).

Next, a maximum value waveform data calculation unit 52202 calculates maximum value waveform data for each predetermined section in waveform data of each of the four oblique detection systems 102M1 to 102M4 during the jth scan of the sample 1 to obtain the waveforms 10101 to 10104 in FIG. 11 (S303). Similarly, a maximum value waveform data calculation unit 52204 calculates maximum value waveform data for each predetermined section in waveform data of each of the four oblique detection systems during the j+1th scan of the sample 1 to obtain the waveforms 10105 to 10108 in FIG. 11 (S304).

Next, a maximum value waveform data integration processing unit 52203 executes integrated processing of adding the waveforms 10101 to 10104 and the waveforms 10105 to

10108 to obtain the waveform 10109, which is the added data waveform in a bottom column of the table in FIG. 11 (S305).

Next, the defect detection unit 523 processes the waveform 10109, which is the added data waveform obtained in S305, to detect the defect (S306). There are various methods for detecting the defect, for example, a waveform portion larger than a preset threshold value is detected as a defect by comparing the threshold value with the signal waveform.

Although a description is omitted, detection signals from the upper detection units 102-3 and 103-3 in FIG. 1 may also be processed together.

According to the present embodiment, even if the fluctuation of the illumination greatly reduces the amount of light from the defect, it is possible to reliably detect the minute defect on a surface of a sample by reducing an influence of a decrease in the amount of light without measuring the scattered light in the vertical direction from the sample 1.

Fourth Embodiment

The fourth embodiment of the invention will be described with reference to FIGS. 13 to 15. Since a configuration of an apparatus according to the present embodiment is the same as that according to the third embodiment, the description thereof will be omitted.

FIG. 13 shows correlation value data 10201 obtained according to the present embodiment. The correlation value data 10201 is correlation value data obtained by setting a predetermined threshold value for a waveform obtained by adding the waveforms 10001 to 10004 shown in FIG. 10B in the third embodiment and each of the waveforms 10005 to 10008 and executing cross-correlation for a region exceeding the threshold value.

When reflected light is detected while the sample 1 is rotated, the jth and j+1th scans overlap in the S2 direction. Since an optical axis deviation of an illumination fluctuates at a low frequency with respect to a scan of the illumination spot, a correlation value peak 10202 corresponding to a position deviation of the illumination can be detected by cross-correlation.

A table 1030 in FIG. 14 shows in a list format a graph of relation between the S1 direction position and the signal light amount obtained by the detection systems for each sensor unit when the illumination spot 20 scans the sample 1 in the S1 direction while rotating the sample 1, and a graph in which outputs of the sensors are added.

Here, since the sample 1 has no pattern other than the defect, it is necessary to align samples using the detected defect. Since it is assumed that scattering from the defect has a Poisson distribution, scattered light from the defect cannot be detected by all the sensor units. For example, in waveforms 10303 and 10304 shown in FIG. 14, no strong signal (peak waveform) is detected in the section 10000. Therefore, before executing a correlation, it is necessary to add signals of detectors during the same scan to execute a stable cross-correlation calculation. Although the cross-correlation calculation is executed here, other matching algorithms such as a sum of squared difference (SSD) and a sum of absolute difference (SAD) may be applied as appropriate.

In FIG. 14, waveforms 10301 to 10304 represented by solid lines are waveforms obtained by deviating positions of the waveforms 10001 to 10004 based on a position deviation estimation amount calculated based on the correlation value peak 10202 shown in FIG. 13. The waveforms 10001 to 10004 are output from the detection systems represented by solid lines in FIG. 10B in the third embodiment. In FIG. 14, waveforms 10305 to 10308 represented by broken lines are waveforms obtained by, deviating positions of the waveforms 10005 to 10008 based on a position deviation estimation amount calculated based on the correlation value peak 10202. The waveforms 10005 to 10008 are output from the detection systems represented by broken lines in FIG. 10B in the third embodiment.

A waveform 10309 in a graph shown in a bottom column in FIG. 14 is an addition result of the waveforms 10301 to 10308. As a result, it can be seen that the waveform 10309 has a large peak value in the section 10000 and a noise in the other sections is reduced to a small value.

The sample 1 does not necessarily have many defects. Therefore, if there is no defect in the vicinity to be processed, a peak cannot be detected by the cross-correlation. On the other hand, it can be said that there is no need for alignment in a region where no defect is present. If peaks in the cross-correlation cannot be obtained, a correction is not executed. A position deviation amount is calculated by an integrated image in which the defect can be manifested and which can be expected to calculate the position deviation amount with high accuracy. The position deviation amount calculated by the integrated image is also applied to an alignment of outputs from other sensor units.

FIG. 15A shows a flow of signal processing according to the present embodiment, and FIG. 15E shows a configuration of a signal integration unit 522-2 according to the present embodiment. First, the rotating sample 1 mounted on the stage 104 is irradiated with an illumination light from the illumination unit 101 described in the first embodiment, and the reflected light from the sample 1 is detected by each of the four oblique detection systems 102M1 to 102M4 described with reference to FIG. 10A. Accordingly, the waveforms 1001 to 1004 detected respectively by the four oblique detection systems 102M1 to 102M4 during the jth scan shown in FIG. 10B and the waveforms 1005 to 1008 detected respectively by the four oblique detection systems 102M1 to 102M4 during the j+1th scan are obtained (S401).

Next, an added data creation unit 52211 in the signal integration unit 522-2 of the signal processing unit 5200 executes integrated processing of adding the waveforms 1001 to 1004 detected respectively by the four oblique detection systems 102M1 to 102M4 during the jth scan, and obtains added waveform data corresponding to the waveform 10009 which is the added data in the bottom column of the table in FIG. 10B (S402).

Similarly, the signal integration unit 522 of the signal processing unit 5200 executes integrated processing of adding the waveforms 1005 to 1008 detected by the four oblique detection systems during the j+1th scan, and obtains the added waveform data corresponding to the waveform 10009 which is the added data in the bottom column of the table in FIG. 10B (S403).

Next, a calculation unit 52212 of a correlation value between added data calculates a correlation value between the added waveform data obtained by adding the waveforms detected by the four oblique detection systems during the jth scan obtained in S402 and the added waveform data obtained by adding the waveforms detected by the four oblique detection systems during the j+1th scan obtained in S403 (S404) to obtain the correlation value data as shown in FIG. 13.

Next, a correlation value peak detection unit 52213 determines, based on a correlation calculated in S404, whether a peak is present corresponding to the correlation value peak 10202 as described with reference to FIG. 13 (S405). If the correlation value peak detection unit 52213 determines that there is a peak value in S405 (Yes in S405), a waveform data deviation correction unit 52214 corrects a deviation of the waveform with a relative deviation amount between the waveforms obtained during the jth and j+1th scans. The relative deviation amount is obtained based on a correlation peak position as described with reference to FIG. 14 (S406). A waveform data integration processing unit 52215 integrates the waveforms, in which the relative deviation amount is corrected and which are obtained during the jth and j+1th scans, to generate waveform data corresponding to the waveform 10309 in FIG. 14 (S407).

Then, as in the case according to the third embodiment, the waveform data integrated and generated by the waveform data integration processing unit 52215 in S407 is compared with a threshold value set in advance by the defect detection unit 523. If a signal larger than the threshold value is detected in the integrated waveform data, the signal is detected as a defect (S408).

On the other hand, if it is determined that there is no peak value in S405 (No in S405), the processing proceeds to S409 and proceeds to S407 without correcting the deviation of the waveform in S406 to integrate the waveforms of the jth and j+1th scans, and signals are compared with the threshold value in S408. If the signal larger than the threshold value is detected, the signal is detected as a defect.

Similar to the case according to the third embodiment, detection signals from the upper detection units 102-3 and 103-3 in FIG. 1 may also be combined and processed in the present embodiment as well.

According to the present embodiment, the relative deviation amount between the waveforms is obtained during the jth and j+1th scans from the correlation peak position in the signal waveforms of the jth and j+1th scans, and thus the defect can be detected reliably by not executing the correction if the signal waveforms of the jth and j+1th scans do not contain a defect signal.

Fifth Embodiment

The fifth embodiment of the invention will described with reference to FIGS. 18 to 22. In the present embodiment, the detection units 102-1 and 102-2 that detect scattered light from the sample 1 described in the first embodiment or detection systems other than detectors in the four oblique detection systems 102M1 to 102M4 described in the third embodiment are replaced with an oblique detection system 1800 as shown in FIG. 18.

In the oblique detection system 1800 in FIG. 18, a reference numeral 1021 denotes an objective lens, and reference numerals 1028a to 1028c denote cylindrical lens arrays each including the same number of cylindrical lenses. A reference numeral 103-5 is a sensor unit. The cylindrical lens array 1028a is provided at a position conjugate with a pupil of the objective lens 1021. Images of a plurality of the samples 1 that match the number of lenses of the cylindrical lens array are formed on the sensor unit 103-5.

The cylindrical lens array 1028a includes N cylindrical lenses 1028a1 to 1028aN, and the cylindrical lens array 1028b also includes N cylindrical lenses 1028b1 to 1028bN. The cylindrical lenses 1028a1 to 1028aN are lenses having focal lengths different from those of the cylindrical lenses 1028b1 to 1028bN. The cylindrical lens array 1028c includes the same number of cylindrical lenses, and it is possible to form images of a pupil of the objective lens 1021 divided by the cylindrical lenses 1028a1 to 1028aN of the cylindrical lens array 1028a on the sensor unit 103-5 at the same magnification.

Tilt angles between the sample 1 and the pupils divided by the cylindrical lenses 1028a1 to 1028aN of the cylindrical lens array 1028a are different, and thus when the images are formed on the sensor unit 103-5 with a same-magnification imaging system, sizes of the images to be formed are different depending on a position of a detection surface of the sensor unit 103-5. Therefore, in the present embodiment, the lenses formed in the cylindrical lens array 1028a and the cylindrical lens array 1028b function as beam expanders with different magnifications for the pupil, and form the images on the sensor unit 103-5 at the same magnification.

With this configuration, a numerical aperture per image formed on the sensor unit 103-5 is reduced. Therefore, a depth of focus becomes larger, and an imaging detection becomes possible even in a state in which a normal direction of the sample 1 and an optical axis of the objective lens 1021 do not match.

FIG. 19A shows an image formation state on the sensor unit 103-5. Photoelectric elements are formed in a two-dimensional manner in each of pixel blocks 1031 to 1034. First, the pixel block 1031 will be described. Reference numerals 1031a to 1031d are pixel groups formed in the pixel block 1031, and light from compartments W-a to W-d at positions of the illumination spot 20 shown in FIG. 19B is imaged, respectively.

In FIG. 19A, reference numerals 1031a1 to 1031aN are pixels belonging to the pixel group 1031a, and each pixel outputs a predetermined current when a photon is incident. Outputs of pixels belonging to the same pixel group are electrically connected, and one pixel group outputs a sum of current outputs of all the pixels belonging to this pixel group. Similarly, pixel blocks 1032 to 1034 also perform output corresponding to the compartments W-a to W-d at the position of the illumination spot 20. Finally, the outputs corresponding to the same compartment from the separate pixel groups 1031a to 1031d are electrically connected and are performed corresponding to the numbers of photons detected from the compartments W-a to W-d.

FIG. 20 shows an internal circuit of the sensor unit 103-5. In FIG. 19B, a photoelectric conversion unit that performs the outputs corresponding to the four compartments W-a to W-d has been described. In FIG. 20, an example will be described in which the compartments are expanded to eight compartments. Eight pixel groups are formed in each of the pixel blocks 1031 to 1034. For example, pixel groups 1031a to 1031h are formed in the pixel block 1031, and similar pixel groups are also formed in the pixel blocks 1032 to 1034.

A pixel group 1031a5, which is an enlarged view of a part of the pixel group 1031a, is a fifth pixel of the pixel group 1031a. An avalanche photodiode operating in Geiger mode as the pixel 1031a5 is connected to a signal line 1035-1a via a quenching resistor 1031a5Q. Similarly, all pixels belonging to the pixel group 1031a are connected to the signal line 1035-1a, and when the photon is incident on the pixel, a current is passed through the signal line 1035-1a.

A reference numeral 1035-2a is a signal line in which pixels of a pixel group 1032a are connected. As described above, all the pixel groups are provided with signal lines to which the pixels belonging to the pixel group are electrically connected. In order to detect scattered light from the same position in the sample 1, the signal lines are connected to a signal line 1035-a at nodes 1036-1a to 1036-4a in pixel groups 1031a, 1032a . . . 1034a.

The signal line 1035*a* is connected by a pad 1036-*a* and is transmitted to the signal processing unit 52000 described in the first embodiment. Similarly, pixels belonging to pixel groups 1031*b* to 1034*b* are connected to a signal line 1035-*b*, is connected by a pad 1036-*b*, and is transmitted to the signal processing unit 52. A signal transmitted from the sensor unit 103-5 to the signal processing unit 5200 is processed by the signal processing unit 5200 to detect a defect.

With reference to FIG. 21, a deviation of a position of a sample surface in a sensor unit when the sample surface is deviated by $\Delta Z$ in the configuration in FIG. 1 will be described.

Reference numerals 103-10 to 103-30 in FIG. 21 denote imaging sensors of sensor units 103-11 to 103-13, respectively. Reference numerals 103-115 and 103-215 are images of the defect 15 formed on surfaces of the imaging sensors 103-10 to 103-30. Reference numerals 103-116 and 103-216 are images of a defect 16 formed on the surfaces of the imaging sensors 103-10 to 103-30 when a surface of the sample 1 is deviated by $\Delta Z$ and moves to a position 11 and the defect 15 deviates to a position of the defect 16.

Reference numerals 103-120, 103-220, and 103-320 show images of the illumination spot 20 formed on the surfaces of the imaging sensors 103-10 to 103-30, respectively. Reference numerals 103-121, 103-221, and 103-321 show images of the illumination spot 21 formed on the surfaces of the imaging sensors 103-10 to 103-30 when the sample surface is deviated by $\Delta Z$. Here, detection units 102-11 and 102-12 are provided symmetrically in the S2 direction with respect to a normal of the sample 1. An optical axis of a detection unit 102-13 coincides with a normal direction of the surface of the sample 1.

Assuming that an incidence angle of the optical axis 120 of illumination light is $\theta 1$, a deviation amount $\Delta$spot of a position of an illumination spot image on the surface of the sample 1 when the illumination spot 20 is deviated to a position of an illumination spot 21 since the surface of the sample 1 is deviated by $\Delta Z$ is expressed by a following formula.

[Math 7]

$$\Delta\text{spot} = \Delta Z/\tan\theta 1 + \alpha \tag{Formula 7}$$

In the formula, $\alpha$ is a deviation of an illumination spot.

Assuming that an elevation angle of the detection unit 102-12 is $\theta 2$, in an imaging sensor 103-20, a deviation amount $\Delta S2\_2$ of the image 103-216 of the defect 15 from the image 103-215 of the defect 15 due to the $\Delta Z$ deviation of the surface of the sample 1 is expressed by a following formula.

[Math 8]

$$\Delta S2\_2 = -\Delta Z/\tan\theta 2 \tag{Formula 8}$$

A positive and negative of a deviation amount $\Delta S2\_1$ of the image 103-116 of the defect 16 from the image 103-115 of the defect 15 formed on the imaging sensor 103-10 is reversed from that of the deviation amount $\Delta S2\_2$.

A deviation amount $\Delta$spot2 of the image 103-221 of the illumination spot 21 from the image 103-220 of the illumination spot 20 in the imaging sensor 103-20 is as follows.

[Math 9]

$$\Delta\text{spot2} = -\Delta Z/\tan\theta 2 + \Delta Z/\tan\theta 1 + \alpha \tag{Formula 9}$$

A deviation amount $\Delta$spot1 of the image 103-121 of the illumination spot 21 from the image 103-120 of the illumination spot 20 in the imaging sensor 103-10 is as follows.

[Math 10]

$$\Delta\text{spot1} = \Delta Z/\tan\theta 2 + \Delta Z/\tan\theta 1 + \alpha \tag{Formula 10}$$

When the (Formula 9) is subtracted from the (Formula 10), a position deviation of an illumination spot can be corrected.

[Math 11]

$$\Delta\text{spot1} - \Delta\text{spot2} = 2\Delta Z/\tan\theta 2 \tag{Formula 11}$$

The $\Delta$spot1 and the $\Delta$spot2 are calculated based on positions of centers of gravity of haze light amounts of the imaging sensor 103-10 and the imaging sensor 103-20, $2\Delta Z/\tan\theta 2$ is obtained, and $\Delta S2\_2$ is obtained using (Formula 8). Accordingly, a deviation amount of a defect on a sensor surface can be obtained.

In this method, if a one-dimensional sensor is used for the sensor unit 103-11 and the detection unit 103-12, a position deviation of an illumination spot in the S1 direction cannot be measured. Therefore, as described in the first embodiment, the detection unit 102-13 is provided with the sensor unit 102-35 that detects a position of the illumination spot in the S1 direction, and a fluctuation of $\Delta S1$ is monitored.

A specific integration method will be described with reference to FIGS. 22A to 22F. As shown in FIG. 22A, while the sample 1 is rotated, the illumination spot 20 and a detection region are moved in the S2 direction to scan the sample in a spiral shape. In FIG. 22B, a reference numeral 250 denotes an output of each of the eight pixels in the S2 direction obtained by an i+1th scan, and a reference numeral 260 is an output of each of the eight pixels in the S2 direction obtained by an i+1th scan. The illumination spot 20 has a Gaussian profile, and shows a case in which the profile is divided by eight pixels.

Reference numerals 251 and 261 in FIG. 22C are two-dimensional image data for the ith and i+1th scans obtained by scanning the eight pixels corresponding to the outputs 250 and 260 in FIG. 22B in the S1 direction. A rotary encoder (not shown) is provided on the stage 104. On the stage 104, a wafer, which is the sample 1, can be placed. Data is sampled by a synchronization signal from the rotary encoder generated with a rotation of the stage 104 so that positions of the outputs 250 and 260, which are two-dimensional image data, in the S1 direction match.

On the other hand, as shown in FIG. 22B, the positions of the outputs 250 and 260, which are the two-dimensional image data, in the S1 direction fluctuate due to a position deviation of the illumination spot 20. As shown in FIGS. 22D and 22E, a deviation amount of an acquisition timing of the two-dimensional image data 261 of the illumination spot from an acquisition timing of the two-dimensional image data 251 is set to $\Delta S1$. If acquisition timings of the sensor units 103-11 to 103-13 are the same, position deviation amounts in the S1 direction are the same.

On the other hand, a deviation amount in the S2 direction varies for each detection unit, is $\Delta S2\_1$ for the detection unit 102-11 as shown in FIG. 22D, and is $\Delta S2\_3$ for the detection unit 102-3 as shown in FIG. 22E. In FIG. 22O, the signal integration unit 522 adds data 2621 to data 2521 acquired during the ith scan by the detection unit 102-11 to generate a synthesized image. The data 2621 is an alignment calculated based on the amount of field movement in the S2 direction, the deviation $\Delta S$ of the illumination spot, and the deviation amount $\Delta S2\_1$ in the S2 direction due to a deviation of the stage in a Z direction.

Similarly, in FIG. 22E, data 2522 for the ith scan obtained by the detection unit 102-12 and data 2622 for the i+1th scan are added to generate a synthesized image. When the synthesized image is generated, a subpixel interpolation is performed to reduce a deterioration of a resolution.

When different synthesized images for each sensor unit are synthesized, a position deviates in the S2 direction. Therefore, the images are resampled in a predetermined position using the subpixel interpolation and are multiplied by a predetermined gain determined by each sensor unit, and then addition processing is executed.

The defect can be detected by processing, using a threshold value, the image synthesized by executing this addition processing.

In the present embodiment, as a typical example, the detection units 102-1 and 102-2, which are arranged symmetrically with respect to a sample normal vector, have been described. However, even if the arrangement is not symmetrical, a height of the sample surface and an illumination spot position can be measured by measuring a distance from a stereo image, and the invention is not limited to this arrangement.

Sixth Embodiment

A sixth embodiment of the invention will be described with reference to FIGS. 23 to 25.

In FIG. 23, a reference numeral 102-40 denotes an objective lens. Reference numerals 102-41 to 43 denote imaging lenses. Reference numerals 102-44 to 45 are lenses that relay a pupil of the objective lens 102-40 or an image of a position conjugate to the pupil. A reference numeral 102-46 is a reflecting mirror having an aperture, and a reference numeral 102-46H in FIG. 24 is an aperture. A reference numeral 102-47 is a reflecting mirror. Reference numerals 103-40 to 42 denote TDI sensors.

FIG. 25 shows a configuration of the TDI sensor 103-42. The TDI sensor is a type of line sensor. The S2 direction is an imaging direction and the S1 direction is a time accumulation direction. The CCD element forming the TDI sensor increases a detected amount of weak light by moving a charge accumulated by a photoelectric conversion in a TDI transfer direction in synchronization with a scan of the sample 1 in the S1 direction, and by accumulating the charge by the photoelectric conversion.

In FIG. 25, a reference numeral 103-4215 denotes an image of the defect 15 on a sensor surface, and a reference numeral 103-4216 denotes an image of the defect 16 on the sensor surface when a surface of the sample 1 is moved to the position 11 as shown in FIG. 23. A deviation amount of the defect 15 on the sensor surface is reversed in the TDI sensors 103-41 and 103-42.

In the example described with reference to FIGS. 22A to 22E according to the fifth embodiment, the S1 direction is the same for each detection unit. In the present embodiment, the S1 direction changes depending on each sensor unit. Therefore, a height of the sample surface is monitored by triangulation or a capacitance type sensor, and a change in a height of each illumination spot in a scan is obtained to obtain a deviation of the TDI sensors 103-40 and 103-41 in the S1 direction.

The amount of light detected by each of the sensor units 103-40 to 103-42 corresponds to a pupil portion of the objective lens 102-40. Therefore, a deviation amount is calculated by obtaining an angle of a principal ray of a corresponding sensor based on a position of a center of gravity of the pupil portion of the objective lens 102-40.

FIG. 23 shows an angle θ3 of a principal ray corresponding to the TDI sensor 103-42. A deviation amount ΔS_42 of the TDI sensor 103-42 in the S1 direction is calculated using a following formula.

[Math 12]

$$\Delta S\_42 = \Delta Z / \tan \theta 3 \qquad \text{(Formula 12)}$$

If the aperture 102-46H of the reflecting mirror 102-46 shown in FIG. 24 is axisymmetric with respect to an optical axis of the objective lens 102-40 in the S1 direction, a deviation amount ΔS_41 of the TDI sensor 103-41 in the S1 direction can be calculated using a following formula.

[Math 13]

$$\Delta S\_41 = -\Delta Z / \tan \theta 3 \qquad \text{(Formula 13)}$$

After the deviation amount is calculated, images obtained by each sensor are realigned in the S1 direction, and images obtained by performing different spiral scans are added.

The images of each sensor obtained by the addition processing multiplied by a predetermined gain, a deviation of a position of each sensor is corrected, and then the images are integrated. The defect is determined using the integrated image.

According to the present embodiment, even when a height of a defect to be detected fluctuates due to a rotation of a sample, the defect can be reliably detected.

INDUSTRIAL APPLICABILITY

In a manufacturing process of a semiconductor device, the invention can be used in an inspection process for inspecting a foreign matter defect adhering to a surface of a semiconductor wafer.

REFERENCE SIGN LIST

2: laser source
4: outgoing beam adjustment unit
5: beam expander
6: polarization control unit
7: condensing optical unit
5200: signal processing unit
53: control unit
54: display unit
55: input unit
91: condenser lens
92: imaging lens
93: two-dimensional sensor
101: illumination unit
102-1, 102-2, 102-3: detection unit
103-1, 103-2, 103-3: sensor unit
104: stage

The invention claimed is:
1. A defect inspection apparatus comprising:
an illumination optical system comprising an objective lens and an imaging lens and a reflecting mirror disposed therebetween and configured to irradiate a sample with an illumination spot;
a plurality of detectors configured to detect, from a plurality of directions, reflected light from the sample irradiated with the illumination spot by the illumination optical system;
a scan control processor configured to control a scan of the sample with the illumination spot of the illumination optical system by overlapping a plurality of detection regions such that the detection regions partially overlap, the plurality of detection regions being detected by the plurality of detectors configured to execute a detection from the plurality of directions when the sample is scanned with the illumination spot of the illumination optical system; and a signal processor configured to process a signal obtained by detecting B the reflected light from the sample by the plurality of detectors to detect a defect, wherein the signal processor is configured to synthesize an integrated signal by processing the signal detected a plurality of times by overlapping the reflected light of the sample for each detection region by the plurality of detectors;

calculate and record a deviation of a position of the illumination spot with respect to a major axis of the illumination spot and a minor axis of the illumination spot; and detect the defect on a surface of the sample based on the synthesized integrated signal adjusted by at least the stored deviation of the minor axis of the illumination spot.

2. The defect inspection apparatus according to claim 1, wherein the plurality of detectors comprises:

a normal direction detector configured to detect light reflected from the sample irradiated with the illumination spot of the illumination optical system in a normal direction of the sample; and an oblique detector configured to detect light reflected from the sample irradiated with the illumination spot of the illumination optical system in an oblique direction of the sample; and the signal processor is further configured to calculate a fluctuation of a position of the illumination spot of the illumination optical system on the sample based on detection signals of the reflected light obtained by detecting the light reflected in the normal direction of the sample by the normal direction detector;

correct the detection signal of the reflected light obtained by detecting the light reflected in the oblique direction of the sample by the oblique detector; and synthesize an integrated signal obtained by integrating intensity data of the reflected light detected in a plurality of the scans using the corrected detection signal of the reflected light from the oblique detector.

3. The defect inspection apparatus according to claim 1, wherein the plurality of detectors comprises:

a reflected light detector configured to detect reflected light directly reflected from the sample irradiated with the illumination spot of the illumination optical system; and a scattered light detector configured to detect light scattered from the sample irradiated with the illumination spot of the illumination optical system, wherein the signal processor is further configured to calculate a fluctuation of a position of the illumination spot of the illumination optical system on the sample based on a detection signal of the reflected light obtained by detecting the light directly reflected from the sample by the reflected light detector;

correct the detection signal of the reflected light obtained by detecting the scattered light scattered from the sample by the scattered light detector; and synthesize an integrated signal obtained by integrating intensity data of the scattered light detected in the plurality of scans using the corrected detected signal of the scattered light from the scattered light detector.

4. The defect inspection apparatus according to claim 1, wherein the signal processor is further configured to obtain a position deviation amount of an irradiation position of the illumination spot on the sample;

integrate the signal detected a plurality of times by overlapping the reflected light of the sample for each of the detection regions by the plurality of detectors; and process a corrected signal to obtain a position of a defect candidate and the amount of reflected light from the defect candidate, the corrected signal being obtained by correcting, based on the position deviation amount of the irradiation position of the illumination spot calculated by the signal processor, the integrated signal obtained by integrating the signal detected a plurality of times by overlapping the reflected light for each detection region; and detect the defect based on the position of the defect candidate and the amount of the reflected light from the defect candidate.

5. The defect inspection apparatus according to claim 1, wherein the signal processor is further configured to add a plurality of detection signals obtained by executing a detection from the plurality of directions by the plurality of detectors;

generate waveforms in which maximum values of signals in a plurality of divided sections are signal values of the divided sections by dividing, into the plurality of sections, signals for one scan of the sample with the illumination spot for the plurality of the detection signals obtained by executing the detection from the plurality of directions by the plurality of detectors;

integrate the waveforms corresponding to the plurality of the detection signals; and process a signal waveform obtained by the integrated the waveforms.

6. The defect inspection apparatus according to claim 1, wherein the data signal processor is further configured to add a plurality of the detection signals obtained by executing a detection from the plurality of directions by the plurality of detectors for each signal for a first scan of the sample with the illumination spot;

obtain a correlation between an added signal obtained by the signal processor adding the signals for the first scan and an added signal for a second scan before and a third scan after the scan;

detect a peak value of correlation data calculated by the signal processor;

correct, using peak value information of the correlation data detected by the signal processor, a position deviation between waveform data of the added signal obtained by the signal processor adding the signals for the first scan and waveform data of the added signal of signals for the second scan before and the third scan after the first scan;

integrate the waveform data of the added signal obtained by adding the signals for the first scan and the waveform data of the added signal of the signals for the second scan before and the third scan after the first scan, for which the position deviation is corrected by the signal processor; and detect the defect by processing a signal waveform obtained by the signal processor integrating the waveform data.

7. The defect inspection apparatus according to claim 1, wherein
the plurality of detectors comprises:
a cylindrical lens array configured to form a plurality of images of the reflected light from the sample irradiated with the illumination spot of the illumination optical system in each of the plurality of directions; and
a cylindrical lens array sensor configured to detect the plurality of images formed by the cylindrical lens array by photoelectric elements arranged in two dimensions.

8. A defect inspection method for inspecting a defect on a surface of a sample, the defect inspection method comprising:
a step of irradiating the sample with an illumination spot:
a step of detecting, by a plurality of detectors, from a plurality of directions, reflected light from the sample irradiated with the illumination spot;
a step of controlling a scan of the sample with the illumination spot by overlapping detection regions such that the detection regions partially overlap, the detection regions being detected by the plurality of the detectors configured to execute a detection from the plurality of directions when the sample is scanned with the illumination spot;
a step of synthesizing an integrated signal by processing signals detected a plurality of times by overlapping the reflected light of the sample for each of the detection regions by the plurality of detectors;
a step of detecting a defect on a surface of the sample by processing the synthesized integrated signal;
a step of calculating and recording a deviation of a position of the illumination spot with respect to a major axis of the illumination spot and a minor axis of the illumination spot; and
a step of detecting the defect on a surface of the sample based on the synthesized integrated signal adjusted by at least the stored deviation of the minor axis of the illumination spot.

9. The defect inspection method according to claim 8, wherein
the step of detecting, by the plurality of detectors, from the plurality of directions, the reflected light from the sample includes
a step of detecting light reflected from the sample irradiated with the illumination spot in a normal direction of the sample by a normal direction detector among the plurality of detectors, and
a step of detecting light reflected from the sample irradiated with the illumination spot in an oblique direction of the sample with an oblique direction detector among the plurality of detectors, and
the step of synthesizing an integrated signal includes
a step of calculating a fluctuation of a position of the illumination spot on the sample based on detection signals of the reflected light obtained by detecting the light reflected in the normal direction of the sample by the normal direction detector, and correcting the detection signal of the reflected light obtained by detecting the light reflected in the oblique direction of the sample by the oblique direction detector, and
a step of synthesizing an integrated signal obtained by integrating intensity data of the reflected light detected in a plurality of the scans using the corrected detection signal of the reflected light from the oblique direction detector.

10. The defect inspection method according to claim 8, wherein
the step of detecting, by the plurality of detectors, from the plurality of directions, the reflected light from the sample includes
a step of detecting, by a reflected light detector, reflected light directly reflected from the sample irradiated with the illumination spot, and
a step of detecting, by a scattered light detector, light scattered from the sample irradiated with the illumination spot, and
the step of synthesizing an integrated signal includes
a step of calculating a fluctuation of a position of the illumination spot on the sample based on a detection signal of the reflected light obtained by detecting the light directly reflected from the sample by the reflected light detector, and correcting the detection signal obtained by detecting the light scattered from the sample by the scattered light detector, and
a step of synthesizing an integrated signal obtained by integrating intensity data of the scattered light detected in the plurality of scans using the corrected detected signal.

11. The defect inspection method according to claim 8, wherein
the step of synthesizing an integrated signal includes
a step of calculating a position deviation amount of an irradiation position of the illumination spot on the sample,
a step of integrating the signal detected a plurality of times by overlapping the reflected light of the sample for each of the detection regions by the plurality of detectors,
a step of correcting the integrated signal based on the calculated position deviation amount of the irradiation position of the illumination spot,
a step of obtaining a position of a defect candidate and the amount of reflected light from the defect candidate by processing the corrected signal obtained by correcting the integrated signal, and
a step of detecting the defect based on the obtained position of the defect candidate and the obtained amount of the reflected light from the defect candidate.

12. The defect inspection method according to claim 8, wherein
the step of synthesizing an integrated signal includes
a step of adding a plurality of detection signals obtained by executing a detection from the plurality of directions by the plurality of detectors;
a step of generating, in each of the plurality of directions, a maximum value waveform in which maximum values of signals in a plurality of divided sections is are signal values of the divided sections by dividing, into the plurality of sections, signals for one scan of the sample with the illumination spot for the plurality of the detection signals obtained by executing the detection from the plurality of directions by the plurality of detectors;
a step of integrating the maximum value waveform generated in each of the plurality of directions; and
a step of detecting the defect by processing the integrated maximum value waveform.

13. The defect inspection method according to claim 8, wherein
the step of synthesizing an integrated signal includes a step of adding a plurality of the detection signals obtained by executing a detection from the plurality of directions by the plurality of detectors for each signal for one scan of the sample with the illumination spot, a step obtaining a correlation between an added signal obtained by adding the signals for the one scan and an added signal for the other one scan before and after the one scan, a step detecting a peak value of the obtained correlation data, a step of correcting, using peak value information of the detected correlation data, a position deviation between waveform data of the added signal obtained by adding the signals for the one scan and waveform data of the added signal of signals for the other one scan before and after the one scan, a step of synthesizing the integrated signal by integrating the waveform data of the added signal obtained by adding the signals for the one scan, for which the position deviation is corrected, and the waveform data of the added signal of the signals for the other one scan before and after the one scan, for which the position deviation is corrected; and a step of detecting the defect by processing the synthesized integrated signal.

* * * * *